United States Patent
Mitsuyasu et al.

(10) Patent No.: US 12,497,131 B2
(45) Date of Patent: Dec. 16, 2025

(54) DRIVE UNIT FOR HUMAN-POWERED VEHICLE, DRIVE SYSTEM FOR HUMAN-POWERED VEHICLE, AND BATTERY UNIT FOR HUMAN-POWERED VEHICLE

(71) Applicant: Shimano Inc., Osaka (JP)

(72) Inventors: Kento Mitsuyasu, Osaka (JP); Shinichiro Noda, Osaka (JP); Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 663 days.

(21) Appl. No.: 16/750,639

(22) Filed: Jan. 23, 2020

(65) Prior Publication Data

US 2020/0247502 A1 Aug. 6, 2020

(30) Foreign Application Priority Data

Feb. 1, 2019 (JP) ................. 2019-017460

(51) Int. Cl.
*B62M 6/90* (2010.01)
*B60L 50/64* (2019.01)
*B62J 43/13* (2020.01)
*B62J 43/28* (2020.01)
*B62K 19/40* (2006.01)
*B62M 6/55* (2010.01)
*H01M 50/202* (2021.01)
*H01M 50/249* (2021.01)

(52) U.S. Cl.
CPC ............ *B62M 6/90* (2013.01); *B60L 50/64* (2019.02); *B62K 19/40* (2013.01); *B62M 6/55* (2013.01); *H01M 50/202* (2021.01); *H01M 50/249* (2021.01); *H01M 2220/20* (2013.01)

(58) Field of Classification Search
CPC ... B62M 6/90; B62M 6/55; B62M 6/40; B62J 43/13; B62J 43/28; B62J 43/10
USPC .......................................... 180/206.4, 207, 3
See application file for complete search history.

(56) References Cited

U.S. PATENT DOCUMENTS

| 6,095,270 A * | 8/2000 | Ishikawa .................. B62M 6/55 180/68.5 |
| 8,960,702 B2 | 2/2015 | Vollmer et al. |
| 9,227,695 B2 | 1/2016 | Liu et al. |

(Continued)

FOREIGN PATENT DOCUMENTS

| CN | 201311945 Y | 9/2009 |
| CN | 202358266 U | 8/2012 |

(Continued)

OTHER PUBLICATIONS

EP3590813, English translation (Year: 2020).*

*Primary Examiner* — Anne Marie M Boehler
(74) *Attorney, Agent, or Firm* — Global IP Counselors, LLP

(57) ABSTRACT

A drive unit configured to be provided to a human-powered vehicle. The drive unit includes a base on which a crankshaft is provided, a frame mount provided on the base, and a guide provided on the base. The frame mount is configured to be mounted on a frame of the human-powered vehicle. The guide is configured to guide a battery unit in a guide direction extending in a longitudinal direction of the frame so that at least part of the battery unit is arranged inside the frame of the human-powered vehicle in a state in which the frame mount is mounted on the frame.

3 Claims, 20 Drawing Sheets

(56) References Cited

U.S. PATENT DOCUMENTS

| | | | | |
|---|---|---|---|---|
| 9,777,774 | B2* | 10/2017 | Biechele | B62K 19/34 |
| 9,902,457 | B2* | 2/2018 | Hu | B62K 19/30 |
| 10,183,591 | B2* | 1/2019 | Shieh | H01M 50/20 |
| 2005/0029033 | A1* | 2/2005 | Rip | B62J 1/08 |
| | | | | 180/220 |
| 2009/0140022 | A1 | 6/2009 | Lin | |
| 2012/0049483 | A1* | 3/2012 | Dodman | B62M 6/90 |
| | | | | 280/281.1 |
| 2013/0231810 | A1* | 9/2013 | Garcia | B62M 6/45 |
| | | | | 701/22 |
| 2015/0120119 | A1* | 4/2015 | Tauchi | B62M 15/00 |
| | | | | 701/22 |
| 2016/0303961 | A1 | 10/2016 | Hendey et al. | |
| 2016/0375954 | A1 | 12/2016 | Talavasek et al. | |
| 2017/0057582 | A1* | 3/2017 | Nishikawa | B62J 13/04 |
| 2017/0210443 | A1 | 7/2017 | Talavasek et al. | |
| 2017/0313383 | A1* | 11/2017 | Uda | B62M 11/02 |
| 2018/0072378 | A1 | 3/2018 | Talavasek et al. | |
| 2018/0072379 | A1 | 3/2018 | Talavasek et al. | |
| 2018/0072380 | A1 | 3/2018 | Talavasek et al. | |
| 2018/0148128 | A1 | 5/2018 | Talavasek et al. | |
| 2019/0039687 | A1* | 2/2019 | Lay | B62K 19/02 |
| 2020/0062342 | A1* | 2/2020 | Talavasek | B62K 19/34 |
| 2020/0247501 | A1* | 8/2020 | Kameda | B62M 6/60 |
| 2020/0324857 | A1* | 10/2020 | Talavasek | B62J 43/28 |
| 2021/0147028 | A1* | 5/2021 | Wang | B62K 19/36 |
| 2022/0033032 | A1* | 2/2022 | Senoo | B62J 43/28 |

FOREIGN PATENT DOCUMENTS

| | | | | |
|---|---|---|---|---|
| CN | 202414082 U | | 9/2012 | |
| CN | 103129691 A | | 6/2013 | |
| DE | 10 2016 010 338 A1 | | 3/2018 | |
| EP | 3 037 335 A1 | | 6/2016 | |
| EP | 3590813 A1 | * | 1/2020 | B62J 43/13 |
| GB | 2561012 A | | 10/2018 | |
| JP | 10-53178 A | | 2/1998 | |
| JP | 2018-6144 A | | 1/2018 | |
| TW | 478488 U | | 3/2002 | |

* cited by examiner

DRIVE UNIT FOR HUMAN-POWERED VEHICLE, DRIVE SYSTEM FOR HUMAN-POWERED VEHICLE, AND BATTERY UNIT FOR HUMAN-POWERED VEHICLE

CROSS-REFERENCE TO RELATED APPLICATIONS

This application claims priority to Japanese Patent Application No. 2019-017460, filed on Feb. 1, 2019. The entire disclosure of Japanese Patent Application No. 2019-017460 is hereby incorporated herein by reference.

BACKGROUND

Technical Field

The present invention generally relates to a drive unit for a human-powered vehicle, a drive system for a human-powered vehicle, and a battery unit for a human-powered vehicle.

Background Information

Japanese Laid-Open Patent Publication No. 2018-6144 (Patent document 1) discloses an example of a battery unit for a human-powered vehicle that is mounted on a frame of the human-powered vehicle.

SUMMARY

One object of the present disclosure is to provide a drive unit for a human-powered vehicle, a drive system for a human-powered vehicle, and a battery unit for a human-powered vehicle that allow a battery unit to be mounted on a human-powered vehicle.

A drive unit for a human-powered vehicle in accordance with a first aspect of the present disclosure comprises a base on which a crankshaft is provided, a frame mount provided on the base, and a guide provided on the base. The frame mount is configured to be mounted on a frame of the human-powered vehicle. The guide is configured to guide a battery unit in a guide direction extending in a longitudinal direction of the frame so that at least part of the battery unit is arranged inside the frame of the human-powered vehicle in a state in which the frame mount is mounted on the frame.

According to the drive unit of the first aspect, the guide allows the battery unit to be guided into the frame. Thus, the battery unit can be mounted on the human-powered vehicle in a preferred manner.

In accordance with a second aspect of the present disclosure, the drive unit according to the first aspect further comprises a motor provided on the base and configured to apply a propulsion force to the human-powered vehicle.

According to the drive unit of the second aspect, the drive unit including the motor can be used to mount the battery unit on the human-powered vehicle in a preferred manner.

In accordance with a third aspect of the present disclosure, the drive unit according to the second aspect is configured so that the motor has a rotational center axis that is parallel to a rotational center axis of the crankshaft, and an angle between a first plane including the rotational center axis of the crankshaft and the rotational center axis of the motor and a second plane including the rotational center axis of the crankshaft and extending parallel to the guide direction is greater than or equal to 0 degrees and less than or equal to 60 degrees.

According to the drive unit of the third aspect, the motor and the battery unit can easily be disposed close to each other.

In accordance with a fourth aspect of the present disclosure, the drive unit according to the second or third aspect further comprises an electrical connector configured to electrically connect the battery unit and the motor. The electrical connector is located closer to the rotational center axis of the crankshaft than the rotational center axis of the motor.

According to the drive unit of the fourth aspect, the electrical connector is disposed close to the rotational center axis of the crankshaft.

In accordance with a fifth aspect of the present disclosure, the drive unit according to any one of the second to fourth aspects further comprises a battery holder provided on the base and configured to hold the battery unit.

According to the drive unit of the fifth aspect, the drive unit can hold the battery unit with the battery holder in a preferred manner.

In accordance with a sixth aspect of the present disclosure, the drive unit according to the fourth aspect further comprises a battery holder provided on the base and configured to hold the battery unit. The electrical connector is configured to be electrically connected to the battery unit in a case where the battery unit is held by the battery holder.

According to the drive unit of the sixth aspect, the battery holder holds the battery unit so that the battery unit can be easily connected to the electrical connector.

In accordance with a seventh aspect of the present disclosure, the drive unit according to the fourth aspect further comprises a battery holder and a battery cable. The battery holder is provided on the base and configured to hold the battery unit. The electrical cable extends from the base and is electrically connected to the electrical connector.

According to the drive unit of the seventh aspect, the electrical cable easily connects the battery unit and the electrical connector.

In accordance with an eighth aspect of the present disclosure, the drive unit according to any one of the fifth to seventh aspects configured so that the battery holder includes an accommodation cavity in which at least part of the battery unit is arranged, and the accommodation cavity extends through the battery holder in the guide direction in a state in which the battery unit is arranged in the accommodation cavity.

According to the drive unit of the eighth aspect, the battery unit is movable in the guide direction inside the accommodation cavity.

In accordance with a ninth aspect of the present disclosure, the drive unit according to any one of the fifth to eighth aspects is configured so that in a state in which the frame mount is mounted on the frame of the human-powered vehicle and wheels of the human-powered vehicle are all in contact with level ground, the rotational center axis of the motor is located vertically upward from the rotational center axis of the crankshaft or located toward an upper side from the rotational center axis of the crankshaft and toward a front side of the human-powered vehicle, and the battery holder is located further toward the front side of the human-powered vehicle from the rotational center axis of the crankshaft.

According to the drive unit of the ninth aspect, the drive unit and the battery unit can be mounted on the frame of the human-powered vehicle in a preferred manner.

A drive unit for a human-powered vehicle in accordance with a tenth aspect of the present disclosure comprises a base on which a crankshaft is provided, a frame mount provided on the base, and a battery holder provided on the base. The frame mount is configured to be mounted on a frame of the human-powered vehicle. The battery holder includes an accommodation cavity in which at least part of a battery unit elongated in a longitudinal direction is arranged. The accommodation cavity extends through the battery holder in the longitudinal direction of the battery unit in a state in which the at least part of the battery unit is arranged in the accommodation cavity.

According to the drive unit of the tenth aspect, the battery unit is movable in the longitudinal direction of the battery unit inside the accommodation cavity. Thus, the battery unit can be mounted on the frame of the human-powered vehicle in a preferred manner.

In accordance with an eleventh aspect of the present disclosure, the drive unit according to the tenth aspect further comprises a motor provided on the base and configured to apply a propulsion force to the human-powered vehicle.

According to the drive unit of the eleventh aspect, the drive unit including the motor can be used to mount the battery unit on the frame of the human-powered vehicle in a preferred manner.

In accordance with a twelfth aspect of the present disclosure, the drive unit according to the eleventh aspect is configured so that a rotational center axis of the motor is parallel to a rotational center axis of the crankshaft, and an angle between a first plane including the rotational center axis of the crankshaft and the rotational center axis of the motor and a second plane including the rotational center axis of the crankshaft and extending parallel to the longitudinal direction of the battery unit is greater than or equal to 0 degrees and less than or equal to 60 degrees.

According to the drive unit of the twelfth aspect, the motor and the battery unit can easily be disposed close to each other.

In accordance with a thirteenth aspect of the present disclosure, the drive unit according to the twelfth or thirteenth aspect further comprises an electrical connector configured to electrically connect the battery unit and the motor. The electrical connector is located closer to the rotational center axis of the crankshaft than the rotational center axis of the motor.

According to the drive unit of the thirteenth aspect, the electrical connector is disposed close to the rotational center axis of the crankshaft.

In accordance with a fourteenth aspect of the present disclosure, the drive unit according to the thirteenth aspect is configured so that the electrical connector is electrically connected to the battery unit in a case where the at least part of the battery unit is arranged in the accommodation cavity.

According to the drive unit of the fourteenth aspect, the arrangement of the battery unit in the accommodation cavity allows the battery unit and the electrical connector to be easily connected.

In accordance with a fifteenth aspect of the present disclosure, the drive unit according to the thirteenth aspect further comprises an electrical cable extending from the base and electrically connected to the electrical connector.

According to the drive unit of the fifteenth aspect, the electrical cable easily connects the battery unit and the electrical connector.

In accordance with a sixteenth aspect of the present disclosure, the drive unit according to any one of the eleventh to fifteenth aspects is configured so that in a state in which the frame mount is mounted on the frame of the human-powered vehicle and wheels of the human-powered vehicle are all in contact with level ground, the rotational center axis of the motor is located vertically upward from the rotational center axis of the crankshaft or located toward an upper side from the rotational center axis of the crankshaft and toward a front side of the human-powered vehicle, and the battery holder is located further toward the front side of the human-powered vehicle from the rotational center axis of the crankshaft.

According to the drive unit of the sixteenth aspect, the drive unit and the battery unit can be mounted on the frame of the human-powered vehicle in a preferred manner.

A drive unit for a human-powered vehicle in accordance with a seventeenth aspect comprises a base on which a crankshaft is provided, a frame mount provided on the base, a battery holder provided on the base and a motor provided on the base. The frame mount is configured to be mounted on a frame of the human-powered vehicle. The battery holder includes an accommodation cavity in which at least part of a battery unit elongated in a longitudinal direction is arranged. The motor is configured to apply a propulsion force to the human-powered vehicle. A rotational center axis of the motor is parallel to a rotational center axis of the crankshaft, and an angle between a first plane including the rotational center axis of the crankshaft and the rotational center axis of the motor and a second plane including the rotational center axis of the crankshaft and extending parallel to the longitudinal direction of the battery unit is greater than or equal to 0 degrees and less than or equal to 60 degrees.

According to the drive unit of the seventeenth aspect, the motor and the battery unit can easily be disposed close to each other.

In accordance with an eighteenth aspect of the present disclosure, the drive unit according to the seventeenth aspect further comprises an electrical connector configured to electrically connect the battery unit and the motor. The electrical connector is located closer to the rotational center axis of the crankshaft than the rotational center axis of the motor.

According to the drive unit of the eighteenth aspect, the electrical connector is disposed close to the rotational center axis of the crankshaft.

In accordance with a nineteenth aspect of the present disclosure, the drive unit according to the eighteenth aspect is configured so that the electrical connector is electrically connected to the battery unit in a case where the at least part of the battery unit is arranged in the accommodation cavity.

According to the drive unit of the nineteenth aspect, the arrangement of the battery unit in the accommodation cavity allows the battery unit and the electrical connector to be easily connected.

In accordance with a twentieth aspect of the present disclosure, the drive unit according to the eighteenth aspect further comprises an electrical cable extending from the base and electrically connected to the electrical connector.

According to the drive unit of the twentieth aspect, the electrical cable easily connects the battery unit and the electrical connector.

In accordance with a twenty-first aspect of the present disclosure, the drive unit according to any one of the seventeenth to twentieth aspects is configured so that in a state in which the frame mount is mounted on the frame of the human-powered vehicle and wheels of the human-powered vehicle are all in contact with level ground, the rotational center axis of the motor is located vertically upward from the rotational center axis of the crankshaft or located toward an upper side from the rotational center axis of the crankshaft and toward a front side of the human-powered vehicle, and the battery holder is located further toward the front side of the human-powered vehicle from the rotational center axis of the crankshaft.

According to the drive unit of the twenty-first aspect, the battery unit can easily be arranged along the frame of the human-powered vehicle.

A drive unit for a human-powered vehicle in accordance with a twenty-second aspect comprises a base on which a crankshaft is provided, a frame mount provided on the base, a battery holder provided on the base, and a motor provided on the base. The frame mount is configured to be mounted on a frame of the human-powered vehicle. The battery holder is configured to hold a battery unit. The motor is configured to apply a propulsion force to the human-powered vehicle, and an electrical connector configured to electrically connect the battery unit and the motor. The electrical connector is located closer to a rotational center axis of the crankshaft than a rotational center axis of the motor.

According to the drive unit of the twenty-second aspect, the battery unit can be mounted on the frame of the human-powered vehicle in a preferred manner. According to the drive unit of the twenty-second aspect, the electrical connector is disposed close to the rotational center axis of the crankshaft.

In accordance with a twenty-third aspect of the present disclosure, the drive unit according to the twenty-second aspect is configured so that the electrical connector is electrically connected to the battery unit in a case where the battery unit is held by the battery holder.

According to the drive unit of the twenty-third aspect, the battery holder holds the battery unit so that the battery unit can be easily connected to the electrical connector.

In accordance with a twenty-fourth aspect of the present disclosure, the drive unit according to the twenty-second aspect further comprises an electrical cable extending from the base and electrically connected to the electrical connector.

According to the drive unit of the twenty-fourth aspect, the electrical cable easily connects the battery unit and the electrical connector.

In accordance with a twenty-fifth aspect of the present disclosure, the drive unit according to any one of the twenty-second to twenty-fourth aspects is configured so that in a state in which the frame mount is mounted on the frame of the human-powered vehicle and wheels of the human-powered vehicle are all in contact with level ground, the rotational center axis of the motor is located vertically upward from the rotational center axis of the crankshaft or located toward an upper side from the rotational center axis of the crankshaft and toward a front side of the human-powered vehicle, and the battery holder is located further toward the front side of the human-powered vehicle from the rotational center axis of the crankshaft.

According to the drive unit of the twenty-fifth aspect, the battery unit can easily be arranged along the frame of the human-powered vehicle.

A drive unit for a human-powered vehicle in accordance with a twenty-sixth aspect of the present disclosure comprises a base on which a crankshaft is provided, a frame mount provided on the base, a battery holder provided on the base, and a motor provided on the base. The frame mount is configured to be mounted on a frame of the human-powered vehicle. The battery holder is configured to hold a battery unit. The motor is configured to apply a propulsion force to the human-powered vehicle. In a state in which the frame mount is mounted on the frame of the human-powered vehicle and wheels of the human-powered vehicle are all in contact with level ground, a rotational center axis of the motor is located vertically upward from a rotational center axis of the crankshaft or located toward an upper side from the rotational center axis of the crankshaft and toward a front side of the human-powered vehicle, and the battery holder is located further toward the front side of the human-powered vehicle from the rotational center axis of the crankshaft.

According to the drive unit of the twenty-sixth aspect, the drive unit and the battery unit can be mounted on the frame of the human-powered vehicle in a preferred manner.

In accordance with a twenty-seventh aspect of the present disclosure, the drive unit according to any one of the tenth to twenty-sixth aspects further comprises a guide provided on the base and configured to guide the battery unit.

According to the drive unit of the twenty-seventh aspect, the guide allows the battery unit to be guided into the frame. Thus, the battery unit can be mounted on the frame of the human-powered vehicle in a preferred manner.

In accordance with a twenty-eighth aspect of the present disclosure, the drive unit according to the twenty-seventh aspect is configured so that the guide guides a battery unit in a guide direction extending in a longitudinal direction of the frame so that at least part of the battery unit is arranged inside the frame of the human-powered vehicle in a state in which the frame mount is mounted on the frame.

According to the drive unit of the twenty-eighth aspect, the guide allows the battery unit to be guided into the frame. Thus, the battery unit can be mounted on the frame of the human-powered vehicle in a preferred manner.

In accordance with a twenty-ninth aspect of the present disclosure, the drive unit according to any one of the fifth to ninth aspects is configured so that the battery holder is movable in the guide direction.

According to the drive unit of the twenty-ninth aspect, the battery holder can be moved to a position suitable for the dimensional tolerance of the battery unit and the type or the like of the battery unit.

In accordance with a thirtieth aspect of the present disclosure, the drive unit according to any one of the fifth to ninth, twenty-eighth, and twenty-ninth aspects is configured so that the battery holder includes a first restriction configured to restrict movement of the battery unit in the guide direction.

According to the drive unit of the thirtieth aspect, the battery unit can be stably mounted on the frame of the human-powered vehicle by the first restriction.

In accordance with a thirty-first aspect of the present disclosure, the drive unit according to thirtieth aspect is configured so that the guide direction includes a first guide direction in which the battery unit is moved to mount the battery unit on the battery holder, and a second guide direction in which the battery unit is moved to remove the battery unit from the battery holder. The first restriction is configured to restrict movement of the battery unit in at least the second guide direction.

According to the drive unit of the thirty-first aspect, movement of the battery unit in the second guide direction can be restricted by the first restriction in a preferred manner.

In accordance with a thirty-second aspect of the present disclosure, the drive unit according to thirty-first aspect is configured so that the first restriction is switchable between a first state in which the first restriction restricts movement of the battery unit in the second guide direction and a second state in which the first restriction permits movement of the battery unit in the second guide direction.

According to the drive unit of the thirty second aspect, the first restriction is switched between the first state and the second state so that the battery unit can be easily attached to and detached from the battery holder.

In accordance with a thirty-third aspect of the present disclosure, the drive unit according to thirty-second aspect further comprises an operation unit configured to be operated by a user to switch the first restriction between the first state and the second state.

According to the drive unit of the thirty-third aspect, the first state and the second state can be easily switched by the operation unit.

In accordance with a thirty-fourth aspect of the present disclosure, the drive unit according to any one of the thirtieth to thirty-third aspects is configured so that the first restriction includes a second engagement portion engaged with a first engagement portion provided on the battery unit. One of the first engagement portion and the second engagement portion includes a projection, and the other one of the first engagement portion and the second engagement portion includes a recess.

According to the drive unit of the thirty-fourth aspect, movement of the battery unit can be restricted by engagement of the projection and the recess.

In accordance with a thirty-fifth aspect of the present disclosure, the drive unit according to any one of the thirtieth to thirty-fourth aspects is configured so that the first restriction includes an elastic member.

According to the drive unit of the thirty-fifth aspect, the first restriction can be moved or deformed by the elastic member.

In accordance with a thirty-sixth aspect of the present disclosure, the drive unit according to any one of the thirtieth to thirty-fifth aspects is configured so that the first restriction is configured to face the battery unit in a direction parallel to a rotational center axis of the crankshaft in a state in which the battery unit is held by the battery holder.

According to the drive unit of the thirty-sixth aspect, movement of the battery unit can be restricted in a direction parallel to the rotational center axis of the crankshaft.

In accordance with a thirty-seventh aspect of the present disclosure, the drive unit according to any one of the first to thirty-fifth aspects is configured so that the first restriction is configured to face the battery unit in a direction intersecting a direction parallel to a rotational center axis of the crankshaft in a state in which the battery unit is held by the battery holder.

According to the drive unit of the thirty-seventh aspect, movement of the battery unit can be restricted in a direction intersecting a direction parallel to the rotational center axis of the crankshaft.

In accordance with a thirty-eighth aspect of the present disclosure, the drive unit according to any one of the fifth to ninth and twenty-eighth to thirty-seventh aspects is configured so that the guide includes at least one of a recess and a projection that extend in the guide direction.

According to the drive unit of the thirty-eighth aspect, the battery unit can be guided in the guide direction by engagement of the projection and the recess.

In accordance with a thirty-ninth aspect of the present disclosure, the drive unit according to any one of the fifth to ninth and twenty-seventh to thirty-eighth aspects is configured so that the battery holder holds the battery unit in a state in which the battery unit is guided by the guide.

According to the drive unit of the thirty-ninth aspect, the battery unit can be held maintaining a state in which the battery unit is guided by the guide.

In accordance with a fortieth aspect of the present disclosure, the drive unit according to any one of the fifth to thirty-ninth aspects is configured so that the battery holder is attachable to and detachable from the base.

According to the drive unit of the fortieth aspect, the battery holder and the base can be manufactured separately.

In accordance with a forty-first aspect of the present disclosure, the drive unit according to any one of the fifth to thirty-ninth aspects is configured so that the battery holder is integral with the base as a one-piece structure.

According to the drive unit of the forty-first aspect, the number of components can be reduced.

In accordance with a forty-second aspect of the present disclosure, the drive unit according to any one of the fifth to ninth and twenty-seventh to forty-first aspects is configured so that the guide is provided on the battery holder.

According to the drive unit of the forty-second aspect, the guide can be provided on the battery holder.

In accordance with a forty-third aspect of the present disclosure, the drive unit according to any one of the fifth to ninth and twenty-seventh to forty-second aspects is configured so that the guide is integral with the base as a one-piece structure.

According to the drive unit of the forty-third aspect, the number of components can be reduced.

A drive system for a human-powered vehicle in accordance with a forty-fourth aspect of the present disclosure comprises the drive unit according to any one of the first to forty-third aspects and a second restriction provided on a frame of the human-powered vehicle and configured to restrict movement of the drive unit and the battery unit.

According to the drive system of the forty-fourth aspect, the second restriction restricts movement of the battery unit in a preferred manner. Thus, the battery unit can be mounted on the frame of the human-powered vehicle in a preferred manner.

A battery unit in accordance with a forty-fifth aspect of the present disclosure is configured to be inserted into a frame of a human-powered vehicle in a longitudinal direction of the frame. The battery unit comprises a housing extending in the longitudinal direction of the frame and configured to accommodate a battery element and a third restriction configured to restrict movement of the housing in the longitudinal direction of the frame. The third restriction includes a first engaging portion movable between a first position where the first engaging portion is projected in a direction intersecting the longitudinal direction of the frame from an intermediate portion located between two end surfaces of the housing thereby restricting movement of the housing in the longitudinal direction of the frame and a second position where the third restriction portion is moved away from the first position thereby permitting movement of the housing in the longitudinal direction of the frame.

According to the battery unit of the forty-fifth aspect, the third restriction is moved between the first position and the second position so that the battery unit can be mounted on the frame of the human-powered vehicle in a preferred manner.

In accordance with a forty-sixth aspect of the present disclosure, the battery unit according to the forty-fifth aspect further comprises a biasing portion configured to bias the first engagement portion toward the first position and an operation unit configured to be operated by a user to move the first engagement portion from the first position to the second position.

According to the battery unit of the forty-sixth aspect, the third restriction can be moved between the first position and the second position in accordance with the operation of the operation unit.

The drive unit for a human-powered vehicle, the drive system for a human-powered vehicle, and the battery unit for a human-powered vehicle in accordance with the present disclosure allow a battery unit to be mounted on the human-powered vehicle in a preferred manner.

BRIEF DESCRIPTION OF THE DRAWINGS

Referring now to the attached drawings which form a part of this original disclosure.

FIG. 24 shows a state in which the electrical connector is not connected to the electrical connector of the battery unit.

FIG. 25 shows a state in which the electrical connector is not connected to the electrical connector of the battery unit.

DETAILED DESCRIPTION OF EMBODIMENTS DISCLOSURE

Figure 1:
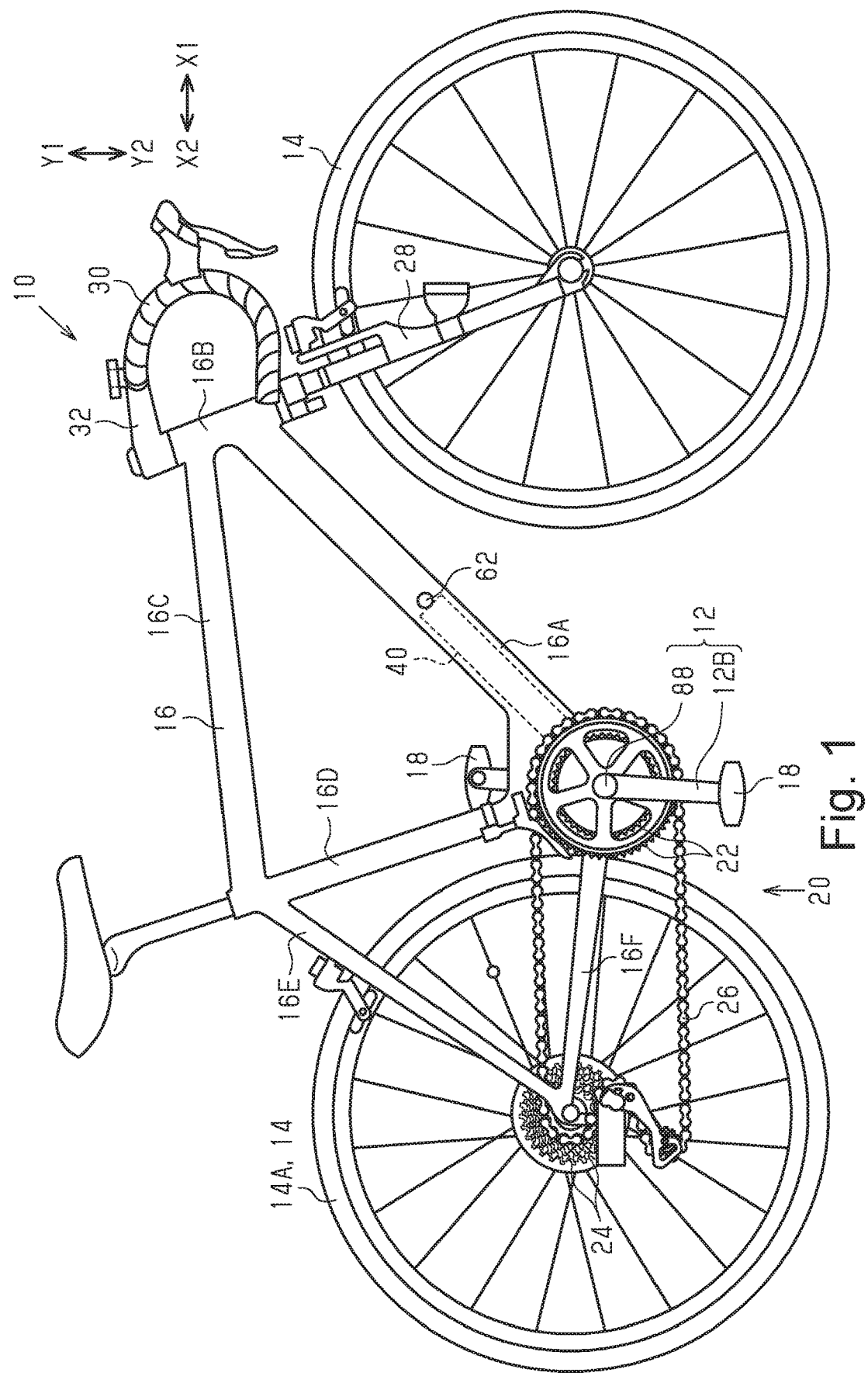
FIG. 1 is a side elevational view of a human-powered vehicle (e.g., a bicycle) including a drive unit and a battery holding device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. In this specification, the phrase "at least one of" as used in this disclosure means "one or more" of a desired choice. In an example, in this specification, the phrase "at least one of" as used in this disclosure means "only one single choice" or "both of two choices" if the number of its choices is two. In another example, in this specification, the phrase "at least one of" as used in this disclosure means "only one single choice" or "any combination of equal to or more than two choices" if the number of its choices is equal to or more than three.

First Embodiment

A first embodiment of a drive unit 80 for a human-powered vehicle, a drive system 60 for a human-powered vehicle, and a battery holding device 40 for a battery holding device will now be described with reference to FIGS. 1 to 26. A human-powered vehicle 10 is a vehicle that can be driven by at least human driving force. The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, a recumbent bike, and an electric bicycle (E-bike). The electric bicycle includes an electric assist bicycle that assists in propulsion of the vehicle with an electric motor. In the embodiments described below, the human-powered vehicle 10 refers to a bicycle.

The human-powered vehicle 10 includes a crank 12 and a pair of wheels 14. The wheels 14 include a drive wheel 14A. The human-powered vehicle 10 further includes a frame 16. Human driving force is inputted to the crank 12. The crank 12 includes a crankshaft 88 configured to rotate relative to the frame 16 and a pair of crank arms 12B provided on opposite axial ends of the crankshaft 88. A pedal 18 is coupled to each of the crank arms 12B. The drive wheel 14A is driven in accordance with rotation of the crank 12. The drive wheel 14A is supported by the frame 16. The crank 12 and the drive wheel 14A are coupled by a drive mechanism 20. The drive mechanism 20 includes a first rotary body 22 coupled to the crankshaft 88. The crankshaft 88 and the first rotary body 22 can be coupled by a first one-way clutch. The first one-way clutch is configured to allow forward rotation of the first rotary body 22 in a case in which the crank 12 is rotated forward and inhibit rearward rotation of the first rotary body 22 in a case in which the crank 12 is rotated rearward. The first one-way clutch can be omitted. In the case of the first one-way clutch being omitted, the crankshaft 88 and the first rotary body 22 are rotated integrally together. The first rotary body 22 includes a sprocket, a pulley, or a bevel gear. In the present embodiment, the first rotary body 22 includes a plurality of sprockets. The first rotary body 22 includes, for example, two sprockets. In a case in which the first rotary body 22 includes a plurality of sprockets, a front derailleur is provided on the human-powered vehicle 10. The drive mechanism 20 further includes a second rotation body 24 and a coupling member 26. The coupling member 26 transmits rotational force of the first rotary body 22 to the second rotation body 24. The coupling member 26 includes, for example, a chain, a belt, or a shaft.

The second rotation body 24 is coupled to the drive wheel 14A. The second rotation body 24 includes a sprocket, a pulley, or a bevel gear. Preferably, a second one-way clutch is provided between the second rotation body 24 and the drive wheel 14A. The second one-way clutch is configured to allow forward rotation of the drive wheel 14A in a case in which the second rotation body 24 is rotated forward and inhibit rearward rotation of the drive wheel 14A in a case in which the second rotation body 24 is rotated rearward. In the present embodiment, the second rotation body 24 includes a plurality of sprockets. The second rotation body 24 includes, for example, seven to thirteen sprockets. In a case in which the second rotation body 24 includes a plurality of sprockets, a rear derailleur is provided on the human-powered vehicle 10.

The wheels 14 include a front wheel and a rear wheel. The front wheel is attached to the frame 16 by a front fork 28. A handlebar 30 is coupled to the front fork 28 by a stem 32. In the embodiments described below, the rear wheel is referred to as the drive wheel 14A. However, the front wheel can be the drive wheel 14A.

The frame 16 of the human-powered vehicle 10 includes a down tube 16A.

The frame 16 further includes a head tube 16B, a top tube 16C, a seat tube 16D, a seatstay 16E, and a chainstay 16F.

The human-powered vehicle 10 includes a battery unit 40 for a human-powered vehicle. The battery unit 40 includes one or more battery elements 42. The battery elements 42 include a rechargeable battery. The battery unit 40 supplies electric power to the drive unit 80. Preferably, the battery unit 40 is connected to an electronic controller provided on the drive unit 80 to perform wired or wireless communication with the electronic controller. The battery unit 40 is configured to perform, for example, power line communication (PLC) with the controller or perform communication through controller area network (CAN) with the electronic controller. The battery unit 40 includes an electrical connector 94 configured to be electrically connected to the electronic controller provided on the drive unit 80.

The battery unit 40 is configured to be inserted into the frame 16 of the human-powered vehicle 10 in a longitudinal direction F of the frame 16. The battery unit 40 includes a housing 46 and a third restriction 48. The housing 46 is configured to accommodate the battery elements 42, and extends in the longitudinal direction F of the frame 16. The third restriction 48 is configured to restrict movement of the housing 46 in the longitudinal direction F of the frame 16. The battery unit 40 is configured to be at least partially accommodated in a battery receptacle 16S formed in the down tube 16A. The shape of the housing 46 is not particularly limited as long as the housing 46 can be guided by a guide 86 and held by a battery holder 72. The housing 46 can be, for example, polygonal, cylindrical, or elliptical.

The battery unit 40 is configured to be movable in the battery receptacle 16S in a guide direction G. The battery unit 40 is inserted into the battery receptacle 16S from an opening 16P provided in the down tube 16A at the end connected to the seat tube 16D and the chainstay 16F. The guide direction G includes a first guide direction G1 and a second guide direction G2. The first guide direction G1 is a direction in which the battery unit 40 is moved so that the battery unit 40 is attached to the battery holder 72. The second guide direction G2 is a direction in which the battery unit 40 is moved so that the battery unit 40 is detached from the battery holder 72. The first guide direction G1 extends from the opening 16P toward the end of the down tube 16A connected to the head tube 16B. The second guide direction G2 extends from the end of the down tube 16A connected to the head tube 16B toward the opening 16P.

The human-powered vehicle 10 includes the drive system 60 for a human-powered vehicle. The drive system 60 is configured to hold the battery unit 40. The drive system 60 includes the drive unit 80 for a human-powered vehicle. The drive system 60 further includes a second restriction 62 provided on the frame 16 of the human-powered vehicle 10 to restrict movement of the battery unit 40 together with the drive unit 80. The battery unit 40 includes a first end 40A and a second end 40B in a longitudinal direction B. In a state in which the battery unit 40 is accommodated in the battery receptacle 16S, the longitudinal direction B of the battery unit 40 extends along the down tube 16A, and the first end 40A is disposed at the opening 16P of the down tube 16A. The drive unit 80 is configured to hold the first end 40A of the battery unit 40. The second restriction 62 contacts the second end 40B to restrict movement of the battery unit 40 in the first guide direction G1. The second restriction 62 is provided in an inner space of the frame 16. The second restriction 62 is provided on the frame 16, for example, so as to extend through the inner space of the frame 16. In one example, the second restriction 62 is cylindrical. The second restriction 62 can be formed by, for example, a bolt 62A. In this case, the frame 16 includes a through hole 17A through which the bolt 62A is inserted and a female thread 17B joined with the bolt 62A. In a case in which the frame 16 does not include the female thread 17B, the bolt 62A can be fixed to the frame 16 by inserting the bolt 62A through the frame 16 and sandwiching the frame 16 between a nut and a head of the bolt 62A. The second restriction 62 can be configured by a portion of the frame 16.

The drive unit 80 includes a base 82, a frame mount 84, and the guide 86. The crankshaft 88 is provided on the base 82. The frame mount 84 is provided on the base 82 and configured to be mounted on the frame 16 of the human-powered vehicle 10. Preferably, the frame mount 84 is provided on a peripheral portion of the base 82. The frame mount 84 includes a plurality of holes 84A. Bolts 85 are inserted through the holes 84A and coupled to female threads of the frame 16 to attach the drive unit 80 to the frame 16. Alternatively, the holes 84A of the frame mount 84 can include female threads, and the bolts 85 can be inserted through holes in the frame 16 and coupled to the female threads of the frame mount 84 to attach the drive unit 80 to the frame 16.

Preferably, the drive unit 80 further includes a motor 90 provided on the base 82 and configured to apply a propulsion force to the human-powered vehicle 10. Preferably, the drive unit 80 further includes the crankshaft 88. Preferably, the drive unit 80 further includes an output portion 92. Preferably, the output portion 92 has a rotational center axis that coincides with a rotational center axis C1 of the crankshaft 88. The first rotary body 22 is coupled to an end of the output portion 92. The output portion 92 includes a hollow shaft. The crankshaft 88 is inserted into the hollow shaft of the output portion 92 so that the hollow shaft surrounds a portion of the crankshaft 88. The output portion 92 is supported by a first bearing on the base 82. The crankshaft 88 is supported by a second bearing on the base 82 and supported by a third bearing on the output portion 92. The output portion 92 is coupled to the crankshaft 88. The output portion 92 and the crankshaft 88 can be directly coupled to each other or can be coupled to each other via another member. The output portion 92 and the crankshaft 88 can be coupled, for example, via a one-way clutch.

Preferably, the drive unit 80 further includes a drive circuit of the motor 90 and an electronic controller configured to control the motor 90. The term "electronic controller" as used herein refers to hardware that executes a software program, and does not include a human. Preferably, the drive circuit and the electronic controller are provided on the base 82. The drive circuit can be included in the electronic controller. The drive circuit and the electronic controller are provided on the same circuit board. The electronic controller includes an arithmetic processing device that executes a predetermined control program. The arithmetic processing device includes, for example, a central processing unit (CPU) or a micro-processing unit (MPU). The electronic controller can include one or more microcomputers. The electronic controller can further include a data storage device (computer memory). The data storage device stores information used for various control programs and various control processes. The data storage device is any computer storage device or any non-transitory computer-readable medium with the sole exception of a transitory, propagating signal. The data storage device includes, for example, a nonvolatile memory and a volatile memory and can includes a ROM (Read Only Memory) device, a RAM (Random Access Memory) device, a hard disk, a flash drive, etc. The drive circuit includes an inverter circuit. The drive circuit controls electric power supplied from the battery unit 40 to the motor 90. The drive circuit is connected to the electronic controller in a manner allowing for wired communication or wireless communication. The drive circuit drives the motor 90 in accordance with a control signal from the electronic controller. The motor 90 is configured to apply a propulsion force to the human-powered vehicle 10. The motor 90 includes an electric motor. The motor is provided to transmit rotation to the front wheel or a transmission path extending from the pedals to the rear wheel. In the present embodiment, the motor 90 is configured to transmit rotation to the output portion 92. Preferably, the first one-way clutch is provided in the power transmission path between the motor 90 and the output portion 92 so that in a case in which the crankshaft 88 is rotated in a direction in which the human-powered vehicle 10 moves forward, the motor 90 will not be rotated by rotational force of the crank 12. Preferably, a speed reducer is provided on the drive unit 80 to reduce the speed of the rotation produced by the motor 90 and output the rotation.

Preferably, the drive unit 80 further includes a torque sensor. The torque sensor is used to detect human driving force. The torque sensor outputs a signal corresponding to torque of human driving force that is input to the crankshaft 88. Preferably, for example, in a case in which the first one-way clutch is provided in the power transmission path, the torque sensor is provided at an upstream side of the first one-way clutch. The torque sensor includes, for example, a strain sensor or a magnetostrictive sensor. In a case in which the torque sensor includes a strain sensor, the strain sensor is provided, for example, on the output portion 92 or a member disposed between the crankshaft 88 and the output portion 92. In a case in which the torque sensor includes a magnetostrictive sensor, a magnetostrictive element is provided on the circumferential surface of the output portion 92 or a member disposed between the crankshaft 88 and the output portion 92, and the magnetostrictive sensor is disposed on the periphery of the magnetostrictive element. The torque sensor is configured to communicate with the electronic controller of the motor 90 through a wireless communication device or a wire. The base 82 is configured to include, for example, a housing. In addition, preferably, the housing accommodates the torque sensor, a portion of the crankshaft 88, the drive circuit of the motor 90, the electronic controller of the motor 90, a portion of the motor 90, and the speed reducer.

The guide 86 is provided on the base 82. In a state in which the frame mount 84 is coupled to the frame 16, the guide 86 is configured to guide the battery unit 40 in the guide direction G, which extends along the longitudinal direction F of the frame 16, so that at least part of the battery unit 40 is disposed in the frame 16 of the human-powered vehicle 10. In a state in which the frame mount 84 is coupled to the frame 16, preferably, the guide 86 is configured to guide the battery unit 40 in the guide direction G, which extends along the longitudinal direction F of the frame 16, so that one half or more of the battery unit 40 is disposed in the frame 16 of the human-powered vehicle 10. Preferably, the guide 86 is configured to restrict movement of the battery unit 40 in a direction intersecting the guide direction G.

Preferably, the motor 90 has a rotational center axis C2 that is parallel to the rotational center axis C1 of the crankshaft 88. A first plane P1 includes the rotational center axis C1 of the crankshaft 88 and the rotational center axis C2 of the motor 90. A second plane P2 includes the rotational center axis C1 of the crankshaft 88 and is parallel to the guide direction G. Preferably, an angle DY formed by the first plane P1 and the second plane P2 is greater than or equal to 0 degrees and less than or equal to 60 degrees. Preferably, an angle DX formed by the first plane P1, which includes the rotational center axis C1 of the crankshaft 88 and the rotational center axis C2 of the motor 90, and the second plane P2, which includes the rotational center axis C1 of the crankshaft 88 and is parallel to the longitudinal direction B of the battery unit 40, is greater than or equal to 0 degrees and less than or equal to 60 degrees.

Preferably, in a state in which the frame mount 84 is mounted on the frame 16 of the human-powered vehicle 10 and the wheels 14 of the human-powered vehicle 10 are all in contact with level ground, the rotational center axis C2 of the motor 90 is located vertically upward from the rotational center axis C1 of the crankshaft 88 or located toward an upper side Y1 from the rotational center axis C1 of the crankshaft 88 and toward a front side X1 of the human-powered vehicle 10, and the battery holder 72 is located further toward the front side X1 of the human-powered vehicle 10 from the rotational center axis C1 of the crankshaft 88.

The drive system 60 further includes a battery holding device 70. The battery holding device 70 is configured to hold the battery unit 40. The battery holding device 70 includes a battery holder 72. The battery holder 72 is provided on the base 82 and configured to hold the battery unit 40. The battery holder 72 can be mounted on the base 82 of the drive unit 80 at a plurality of positions in a predetermined linear direction. The second restriction 62 can be included in the battery holding device 70.

Preferably, the drive unit 80 further includes the battery holder 72. Preferably, the drive unit 80 further includes the battery holder 72 provided on the base 82 and configured to hold the battery unit 40. The battery holder 72 is configured to hold the first end 40A of the battery unit 40. The battery holder 72 can be provided on the exterior of the frame 16 or can be at least partially accommodated in the battery receptacle 16S or entirely accommodated in the battery receptacle 16S. Preferably, in a state in which the battery unit 40 is accommodated in the battery receptacle 16S of the frame 16, the battery holder 72 is configured to hold the first end 40A of the battery unit 40. The battery holder 72 includes a receptacle or accommodation cavity 72S in which at least part of the battery unit 40 is arranged. The accommodation cavity 72S extends through the battery holder 72 in the guide direction G in a state in which the battery unit 40 is arranged in the accommodation cavity 72S. The accommodation cavity 72S extends through the battery holder 72 in the longitudinal direction B of the battery unit 40 in a state in which the battery unit 40 is arranged in the accommodation cavity 72S.

The guide 86 is configured to restrict movement of the battery unit 40 in a direction intersecting the guide direction G. Preferably, the guide 86 includes at least one of a recess and a projection extending in the guide direction G. Preferably, the guide 86 is configured to be engaged with a guide engagement portion 46A provided on the housing 46 of the battery unit 40. Preferably, the guide engagement portion 46A includes at least one of a projection and a recess that is complementary to the shape of the guide 86. At least one of a recess and a projection included in the guide 86 extends in the guide direction G. At least one of a projection and a recess included in the guide engagement portion 46A extends in the longitudinal direction B of the battery unit 40. Preferably, the guide engagement portion 46A is formed from the first end 40A to the second end 40B of the battery unit 40. The guide 86 can include a projection, and the guide engagement portion 46A can include a recess. Alternatively, the guide 86 can include a recess, and the guide engagement portion 46A can include a projection. In a state in which the guide engagement portion 46A is engaged with the guide 86, the battery unit 40 is configured to be movable in the guide direction G. In a case in which the user attaches the battery unit 40 to the frame 16, the user engages a portion of the guide engagement portion 46A formed in the second end 40B with the guide 86 and moves the battery unit 40 in the first guide direction G1. In a case in which the user detaches the battery unit 40 from the frame 16, the user slides the guide engagement portion 46A along the guide 86 to move the battery unit 40 in the second guide direction G2.

The base 82 can be formed from a metal, a synthetic resin, or both a metal and a synthetic resin. The battery holder 72 can be formed from a metal, a synthetic resin, or both a metal and a synthetic resin. The guide 86 can be formed from a metal, a synthetic resin, or both a metal and a synthetic resin. The synthetic resin can include fiber-reinforced resin.

The battery holder 72 can be configured in various shapes. Battery holders 72A, 72B, 72C, and 72D respectively shown in FIGS. 3 to 6 are examples of the battery holder 72. In FIGS. 3 to 6, the drive unit 80 and the battery unit 40 are schematically illustrated. The battery holders 72A, 72B, 72C, and 72D are integral with the base 82 as a one-piece structure. The guide 86 is provided on the battery holders 72A, 72B, 72C, and 72D. The guide 86 is integral with the base 82 as a one-piece structure. The battery holders 72A, 72B, 72C, and 72D form a one-piece structure with the base 82 and the guide 86. The base 82 can be configured to include a plurality of members. In this case, part of the base 82 and the guide 86 are formed integrally as a one-piece structure.

The battery holders 72A, 72B, 72C, and 72D are configured to completely surround the battery unit 40 in a direction intersecting the guide direction G. The battery holders 72A, 72B, 72C, and 72D each include a base connection 73A, two walls 73B and 73C, and a cover 73D. The base connection 73A is connected to the base 82. The two walls 73B and 73C respectively project from the two ends of the base connection 73A in a direction parallel to the rotational center axis C1 of the crankshaft 88. The cover 73D is connected to the ends of the two walls 73B and 73C at the side opposite to the base connection 73A. The base connection 73A extends, for example, in a direction parallel to the rotational center axis C1 of the crankshaft 88 and in the guide direction G. Each of the two walls 73B and 73C extends in the guide direction G and in a direction orthogonal to the direction parallel to the rotational center axis C1 of the crankshaft 88. In a state in which the battery unit 40 is not arranged in the accommodation cavity 72S, the cover 73D is disposed to face the base 82 and the base connection 73A. In the guide direction G, the two walls 73B and 73C are equal in length to the cover 73D. The cover 73D is configured, for example, to be farther from the base 82 at positions closer to a central portion in a direction parallel to the rotational center axis C1 of the crankshaft 88. The two walls 73B and 73C and the cover 73D can have various shapes in correspondence with the shape of the battery unit 40.

Figure 3:
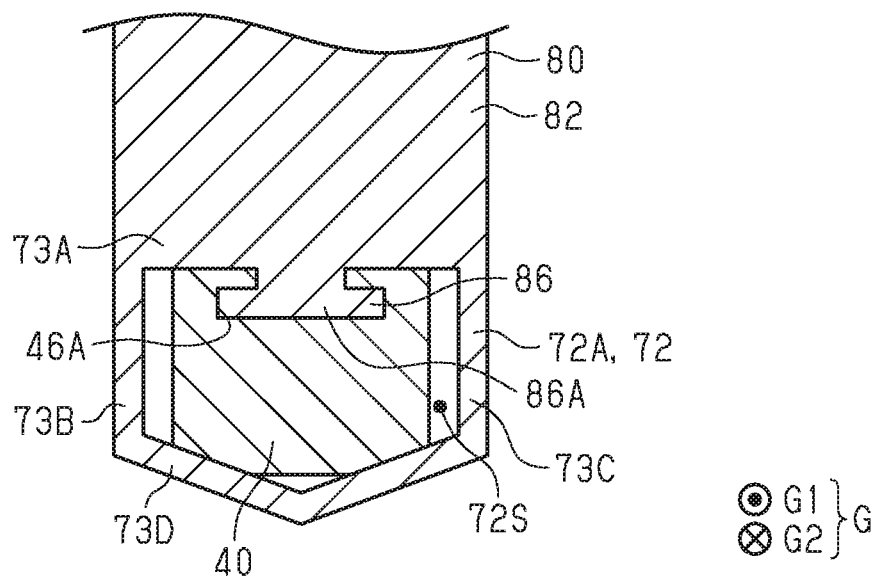
FIG. 3 is a partial cross-sectional view of a first example of a battery holder, a base, and a battery unit taken along line II-II in FIG. 2.

The guide 86 provided on the battery holder 72A shown in FIG. 3 is provided on the base connection 73A. The guide 86, the base connection 73A, the two walls 73B and 73C, and the cover 73D form the accommodation cavity 72S. The guide 86 is provided in a region including the central portion of the base connection 73A in a direction parallel to the rotational center axis C1 of the crankshaft 88. In FIG. 3, the guide 86 includes a single projection 86A. The projection 86A has a T-shaped cross section in a direction orthogonal to the guide direction G. In the guide 86 shown in FIG. 3, the guide 86 can include a plurality of projections 86A. In this case, the projections 86A are separated in a direction parallel to the rotational center axis C1 of the crankshaft 88.

Figure 4:
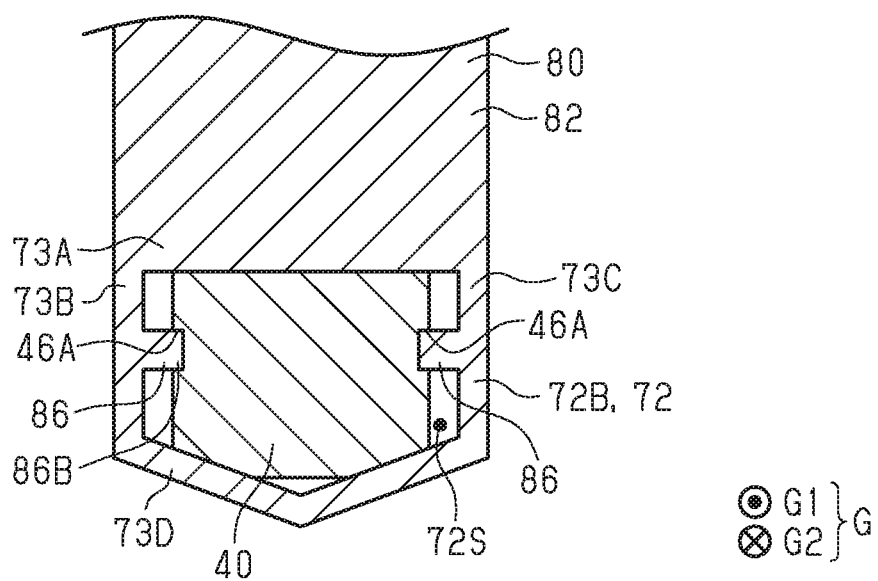
FIG. 4 is a partial cross-sectional view of a second example of a battery holder, a base, and a battery unit taken along line II-II in FIG. 2.

The guide 86 provided on the battery holder 72B shown in FIG. 4 is provided on each of the two walls 73B and 73C. In FIG. 4, the guide 86 includes two projections 86B projecting from surfaces of the two walls 75B and 75C that are faced toward each other. The two projections 86B extend, for example, in the guide direction G. The two projections 86B can be formed to extend between two ends of each of the two walls 75B and 75C in the guide direction G. In FIG. 4, the two projections 86B each have a rectangular cross section in a direction orthogonal to the guide direction G. However, the two projections 86B can have any shape as long as the shape allows the battery unit 40 to be guided. Preferably, in a state in which the battery unit 40 is not disposed in the accommodation cavity 72S, the two projections 86B are disposed to face each other in a direction parallel to the rotational center axis C1 of the crankshaft 88.

Figure 5:
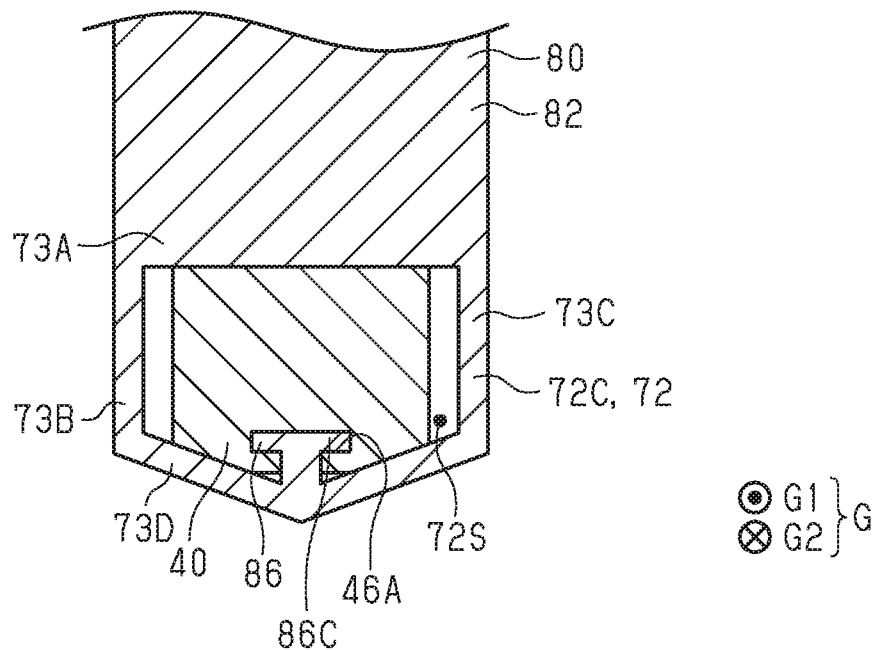
FIG. 5 is a partial cross-sectional view of a third example of a battery holder, a base, and a battery unit taken along line II-II in FIG. 2.

The guide 86 provided on the battery holder 72C shown in FIG. 5 is provided on the cover 73D. The guide 86 is provided in a region including a central portion of the cover 73D in a direction parallel to the rotational center axis C1 of the crankshaft 88. In FIG. 5, the guide 86 includes a single projection 86C. The projection 86C has a T-shaped cross section in a direction orthogonal to the guide direction G. In the guide 86 shown in FIG. 5, the guide 86 can include a plurality of projections 86C. In this case, the projections 86C are separated in a direction parallel to the rotational center axis C1 of the crankshaft 88.

Figure 6:
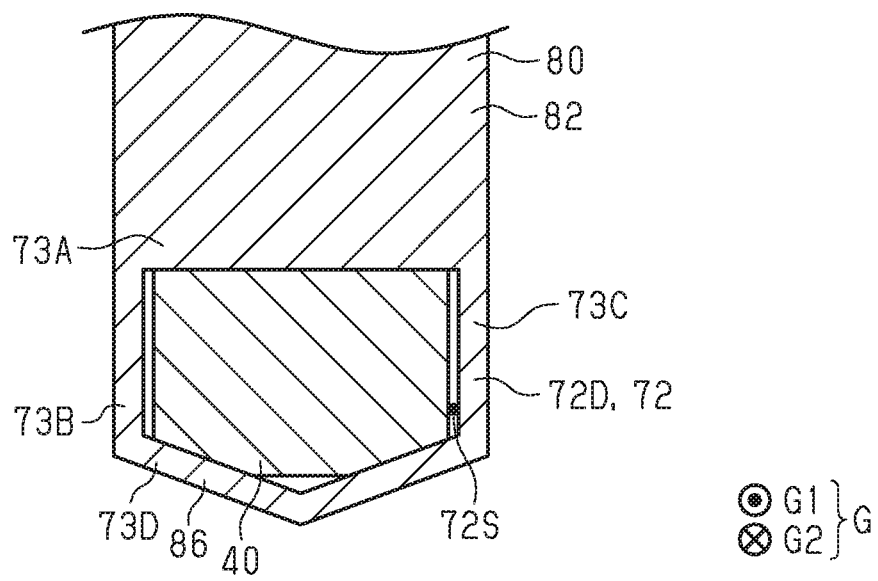
FIG. 6 is a partial cross-sectional view of a fourth example of a battery holder, a base, and a battery unit taken along line II-II in FIG. 2.

In FIG. 6, the battery holder 72D forms at least part of the wall surface of the accommodation cavity 72S. In the battery holder 72D, the guide 86 is formed by at least one of the base connection 73A, the two walls 73B and 73C, and the cover 73D. In the battery holder 72D shown in FIG. 6, for example, the guide 86 is configured by the base connection 73A and the cover 73D. In the battery holder 72D shown in FIG. 6, the cross-sectional area and shape of the accommodation cavity 72S in a direction orthogonal to the guide direction G is slightly larger than the cross-sectional area and shape of the battery unit 40 in a direction orthogonal to the longitudinal direction B of the battery unit 40.

Battery holders 72E, 72F, 72G, 72H, 72J, 72K, 72L, 72M, and 72N shown in FIGS. 7 to 17 are further examples of the battery holder 72. In FIGS. 7 to 17, the drive unit 80 and the battery unit 40 are schematically illustrated. The battery holders 72E, 72F, 72G, 72H, 72J, 72K, 72L, 72M, and 72N are configured to be attachable to and detachable from the base 82. The drive unit 80 includes the base 82 and a holder mount 98. The holder mount 98 is configured to selectively mount the battery holders 72E, 72F, 72G, 72H, 72J, 72K, 72L, 72M, and 72N at a plurality of positions in the predetermined linear direction. The battery holders 72E, 72F, 72G, 72H, 72J, 72K, 72L, 72M, and 72N are configured to be attachable to and detachable from the drive unit 80, on which the crankshaft 88 and the frame mount 84 configured to be mounted on the frame 16 of the human-powered vehicle 10 are provided. The battery holders 72E, 72F, 72G, 72H, 72J, 72K, 72L, 72M, and 72N and the frame mount 84 are configured to be mounted on the drive unit 80 at different positions as viewed in a direction in which the crankshaft 88 extends.

The holder mount 98 and the frame mount 84 are located at different positions as viewed in a direction in which the crankshaft 88 extends. Preferably, the base 82 includes a flat portion 82A parallel to the predetermined linear direction. The holder mount 98 is provided on the flat portion 82A. The flat portion 82A is formed, for example, on each of two ends 82B and 82C of the base 82 in a direction parallel to the rotational center axis C1 of the crankshaft 88. The flat portion 82A can be formed, for example, by an intermediate portion 82D connecting the two ends 82B and 82C of the base 82 in the direction parallel to the rotational center axis C1 of the crankshaft 88. The flat portion 82A can be formed, for example, on the two ends 82B and 82C of the base 82 in the direction parallel to the rotational center axis C1 of the crankshaft 88 and the intermediate portion 82D connecting the two ends 82B and 82C. Preferably, the base 82 includes a recess 82E. Further preferably, at least part of the holder mount 98 is provided in the recess 82E. The wall surface of the recess 82E is included in the flat portion 82A. Preferably, the holder mount 98 is provided in the vicinity of the opening 16P of the frame 16. Preferably, at least part of the frame mount 84 is provided toward the upper side Y1 of the human-powered vehicle 10 from the holder mount 98.

The holder mount 98 includes at least one of a male thread, a female thread, and an elongated hole that extends in a predetermined linear direction. In one example, the holder mount 98 includes an elongated hole 98A and a male threaded fastener 98B having the male thread that is inserted into the elongated hole 98A. In this case, preferably, the holder mount 98 further includes at least one threaded hole 98C with the female thread formed in the base 82. Preferably, the threaded hole with the female thread is provided in each of the two ends 82B and 82C of the base 82 in the direction parallel to the rotational center axis C1 of the crankshaft 88 and extends in the direction parallel to the rotational center axis C1 of the crankshaft 88. The threaded hole 98C with female thread can be provided in at least one of the two ends 82B and 82C of the base 82 and the intermediate portion 82D, and extends in a direction intersecting the direction parallel to the rotational center axis C1 of the crankshaft 88. Preferably, at least part of the holder mount 98 is provided on each of the battery holders 72E, 72F, 72G, 72H, 72J, 72K, 72L, 72M, and 72N. For example, each of the battery holders 72E, 72F, 72G, 72H, 72J, 72K, 72L, 72M, and 72N includes two of the elongated holes 98A extending in the predetermined linear direction and two of the male threaded fasteners 98B having the male threads inserted into the elongated holes 98A, respectively, and joined with the threaded holes 98C having the female threads 98C provided on the drive unit 80. The elongated holes 98A are formed in positions corresponding to the threaded holes 98C having the female threads. The each of battery holders 72E, 72F, 72G, 72H, 72J, 72K, 72L, 72M, and 72N include two contact or abutment portion 75 that are configured to contact or abut the base 82. Preferably, the abutment portions 75 contact or abut each of the two ends 82B and 82C of the base 82 from the outer side in the direction parallel to the rotational center axis C1 of the crankshaft 88. The elongated holes 98A are provided in the abutment portions 75. Preferably, the abutment portions 75 are provided in the recesses 82E. Preferably, at least part of the holder mount 98 is integral with the base 82 as a one-piece structure. For example, the female thread 98C is integral with the base 82 as a one-piece structure. At least part of the holder mount 98 and the base 82 are formed to have a one-piece structure. The base 82 can be configured to include a plurality of members. In this case, a part of the base 82 and at least part of the holder mount 98 are formed integrally as a one-piece structure.

Figure 8:
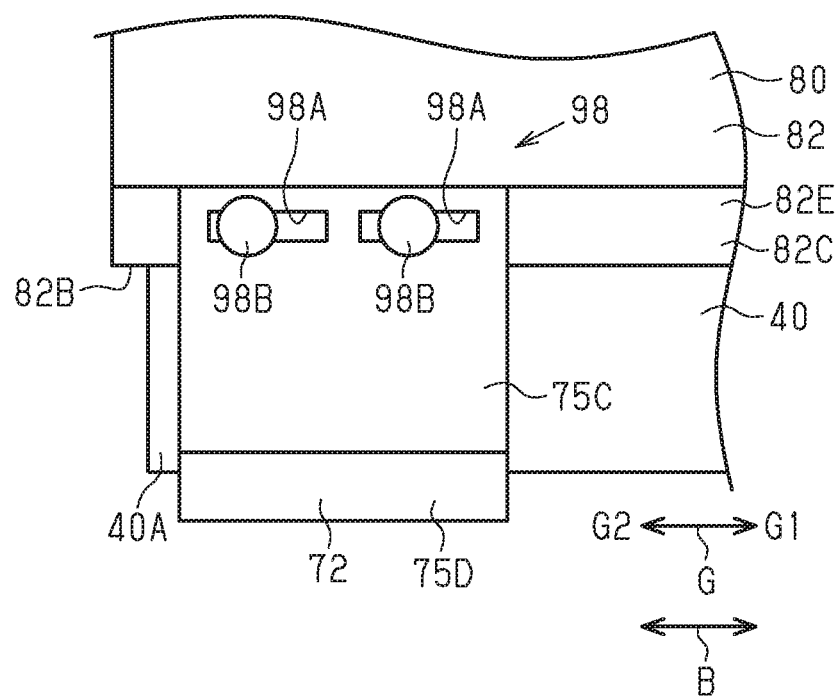
FIG. 8 is a partial side view of the drive unit including the holder mount and the battery holder shown in FIG. 7.

The battery holder 72 shown in FIG. 8 can be mounted on the drive unit 80 provided with the crankshaft 88 at a plurality of positions in the predetermined linear direction. The predetermined linear direction can include a direction intersecting a direction in which the crankshaft 88 extends. Preferably, the predetermined linear direction is orthogonal to the direction in which the crankshaft 88 extends. Preferably, in a state mounted on the frame 16 of the human-powered vehicle 10, the predetermined linear direction extends in the longitudinal direction F of the frame 16 of the human-powered vehicle 10. Preferably, the predetermined linear direction extends in a direction in which the down tube 16A extends. Preferably, the predetermined linear direction coincides with the guide direction G. The structure of the holder mount 98 shown in FIG. 8 is applicable to each of the battery holders 72F, 72G, 72H, 72J, 72K, 72L, 72M, and 72N in addition to the battery holder 72E. Preferably, the battery holders 72E, 72F, 72G, 72H, 72J, 72K, 72L, 72M, and 72N are configured to be movable in the guide direction G.

Figure 9:
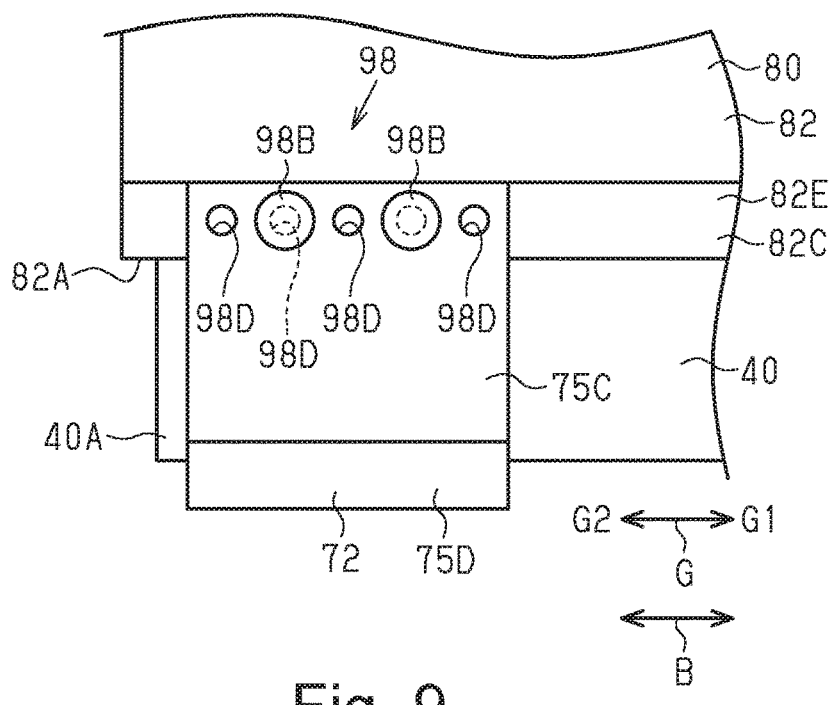
FIG. 9 is a partial side view of a drive unit including a modified example of a holder mount and a modified example of a battery holder.

The holder mount 98 can be configured to be non-movable in the predetermined linear direction. The battery holder 72 shown in FIG. 9 does not have to include the elongated holes 98A. The battery holder 72 shown in FIG. 9 includes a plurality of circular holes 98D aligned in the guide direction G instead of the elongated holes 98A. In this case, each of the male threaded fasteners 98B is inserted into a predetermined one of the holes 98D to adjust the position of the battery holder 72 relative to the drive unit 80 and the frame 16 in the guide direction G. The battery holder 72 shown in FIG. 9 can be configured to be mounted at a single position in the predetermined linear direction. The structure of the holder mount 98 shown in FIG. 9 is applicable to each of the battery holders 72F, 72G, 72H, 72J, 72K, 72L, 72M, and 72N in addition to the battery holder 72E.

Figure 7:
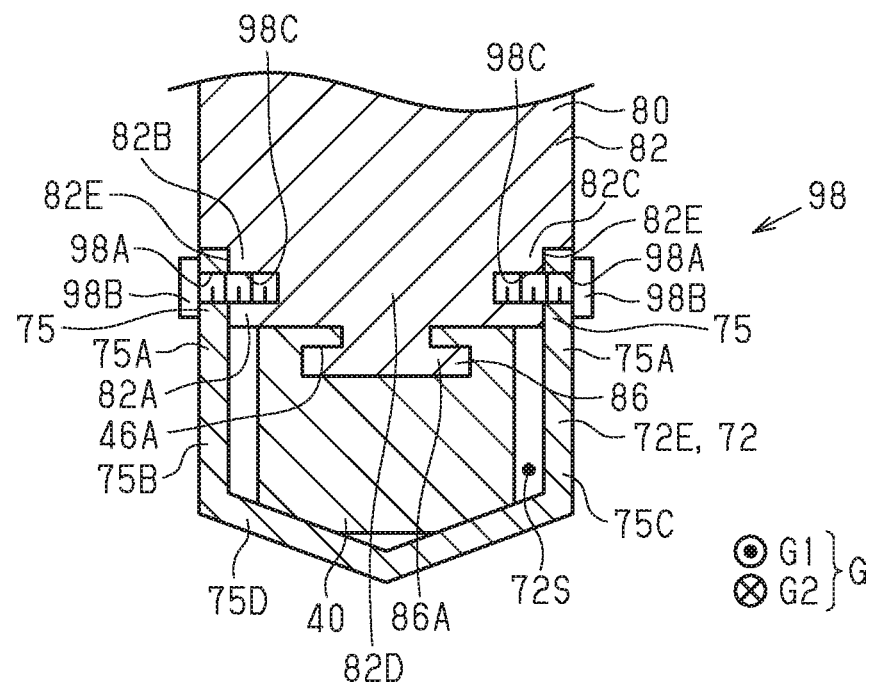
FIG. 7 is a partial cross-sectional view of a fifth example of a battery holder, a holder mount, a base, and a battery unit taken along line II-II in FIG. 2.
Figure 10:
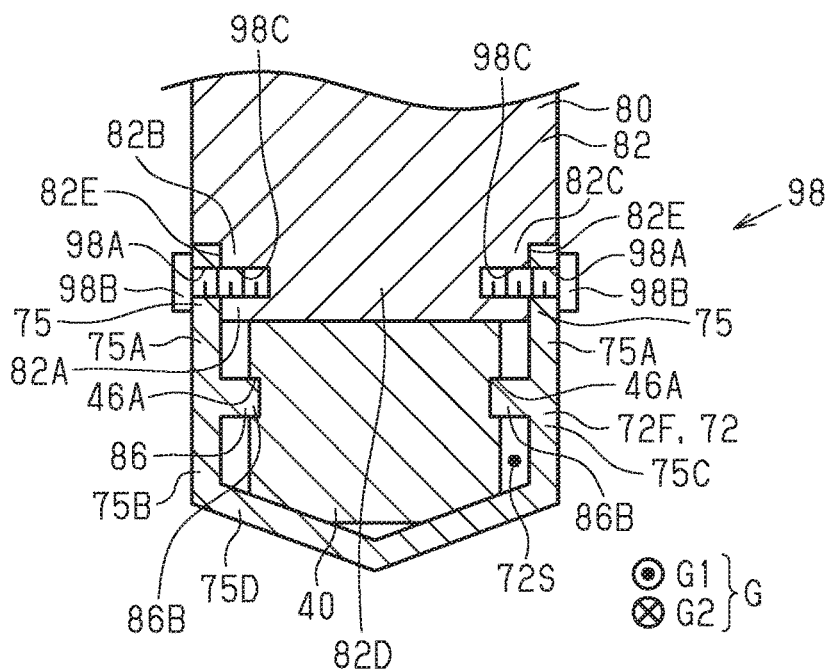
FIG. 10 is a partial cross-sectional view of a sixth example of a battery holder, a holder mount, a base, and a battery unit taken along line II-II in FIG. 2.
Figure 11:
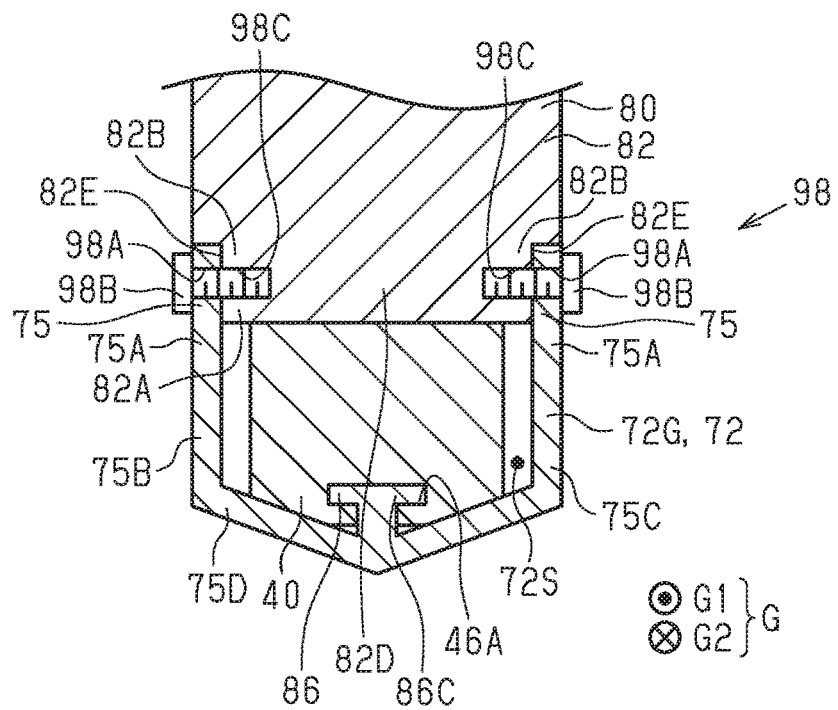
FIG. 11 is a partial cross-sectional view of a seventh example of a battery holder, a holder mount, a base, and a battery unit taken along line II-II in FIG. 2.
Figure 12:
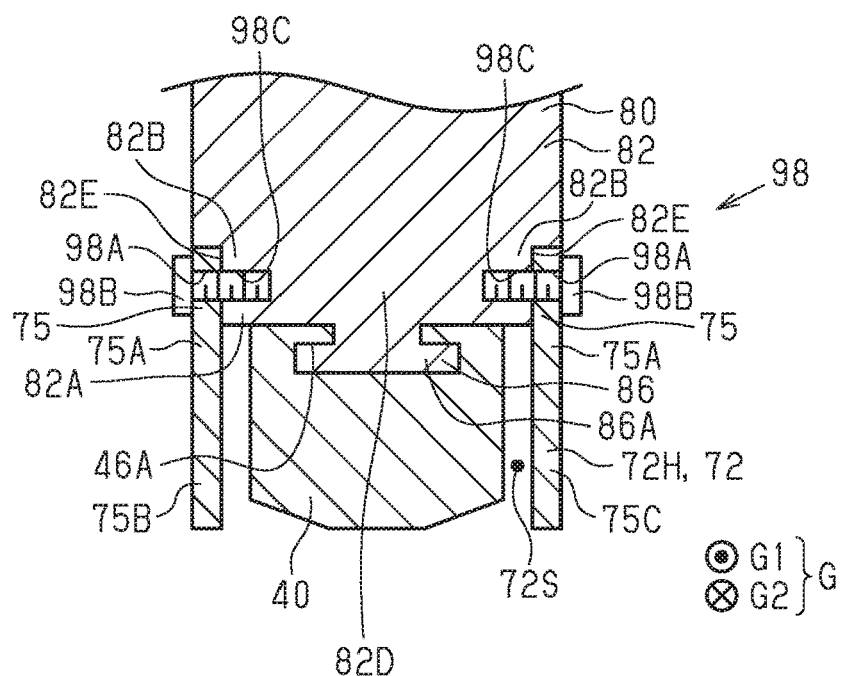
FIG. 12 is a partial cross-sectional view of an eighth example of a battery holder, a holder mount, a base, and a battery unit taken along line II-II in FIG. 2.

The battery holder 72E shown in FIG. 7, the battery holder 72F shown in FIG. 10, the battery holder 72G shown in FIG. 11, and the battery holder 72H shown in FIG. 12 form the accommodation cavity 72S together with the outer peripheral wall surface of the base 82. The battery holders 72E, 72F, 72G, and 72H each include base connections 75A respectively provided on the two ends 82B and 82C, in the direction parallel to the rotational center axis C1 of the crankshaft 88, of the base 82 and two walls 75B and 75C respectively projecting from the base connections 75A. The battery holders 72E, 72F, 72G further each include a cover 75D connected to an end of each of the two walls 75B and 75C at the side opposite to the base 82. Parts of the abutment portions 75 are provided on the base connections 75A, respectively. The base connections 75A extends, for example, in a direction orthogonal to the direction parallel to the rotational center axis C1 of the crankshaft 88 and in the guide direction G. Each of the two walls 75B and 75C extends in the guide direction G and in a direction orthogonal to the direction parallel to the rotational center axis C1 of the crankshaft 88. The shape of the two walls 75B and 75C is similar to the shape of the two walls 73B and 73C. The shape of the cover 75D is similar to the shape of the cover 73D. The holder mount 98 is provided on the ends of the two walls 75B and 75C at the side of the base 82. The guide 86 is not provided on the battery holder 72E and the battery holder 72H. The guide 86 is provided on the battery holder 72F and the battery holder 72G. Preferably, in the battery holder 72H shown in FIG. 12, as viewed in a direction parallel to the rotational center axis C1 of the crankshaft 88, the two walls 75B and 75C extend to a position hiding the battery unit 40 in the direction in which the crankshaft 88 extends and a direction orthogonal to the guide direction G. Preferably, the base connections 75A and the two walls 75B and 75C are formed integrally as a one-piece structure. Preferably, the base connections 75A, the two walls 75B and 75C, and the cover 75D are formed integrally as a one-piece structure.

The guide 86 is provided on the base 82 on which the battery holder 72E shown in FIG. 7 is provided and the base 82 on which the battery holder 72H shown in FIG. 12 is provided. The guide 86 forms the accommodation cavity 72S together with the base 82 and the battery holder 72E or the battery holder 72H. The guide 86 is provided in a region including the central portion of the base 82 in a direction parallel to the rotational center axis C1 of the crankshaft 88. The shape of the guide 86 shown in FIG. 7 is similar to the shape of the guide 86 shown in FIG. 3. The guide 86 is integral with the base 82 as a one-piece structure.

The guide 86 provided on the battery holder 72F shown in FIG. 10 is provided on each of the two walls 75B and 75C. The guide 86 shown in FIG. 10 and the guide 86 shown in FIG. 4 have similar structures.

The guide 86 provided on the battery holder 72G shown in FIG. 11 is provided on the cover 75D. The guide 86 is provided in a region including a central portion of the cover 75D in a direction parallel to the rotational center axis C1 of the crankshaft 88. The shape of the guide 86 shown in FIG. 11 is similar to the shape of the guide 86 shown in FIG. 5. In the same manner as the battery holder 72H shown in FIG. 12, the battery holder 72E shown in FIG. 7, the battery holder 72F shown in FIG. 10, and the battery holder 72G shown in FIG. 11 can include the two walls 75B and 75C, and the cover 75D can be omitted.

Figure 13:
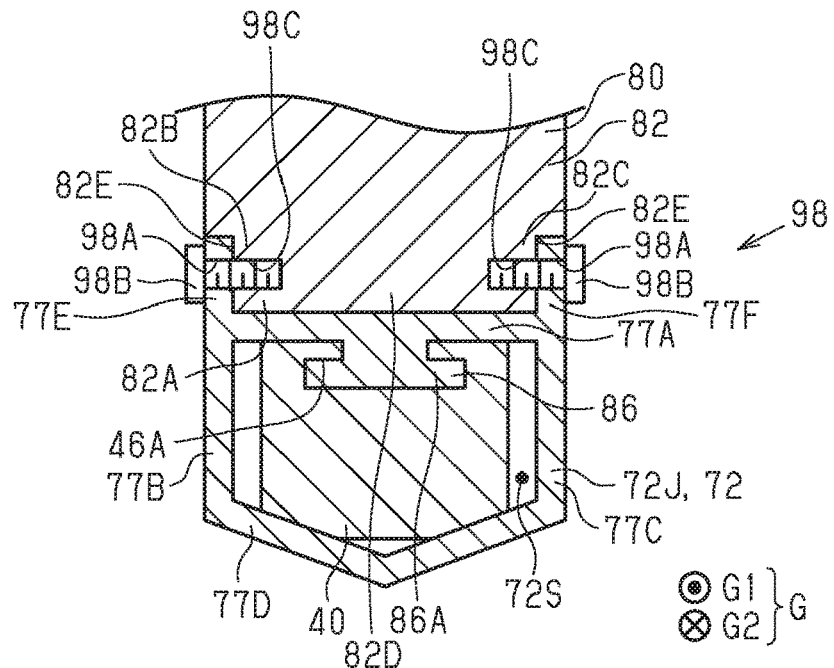
FIG. 13 is a partial cross-sectional view of a ninth example of a battery holder, a holder mount, a base, and a battery unit taken along line II-II in FIG. 2.
Figure 14:
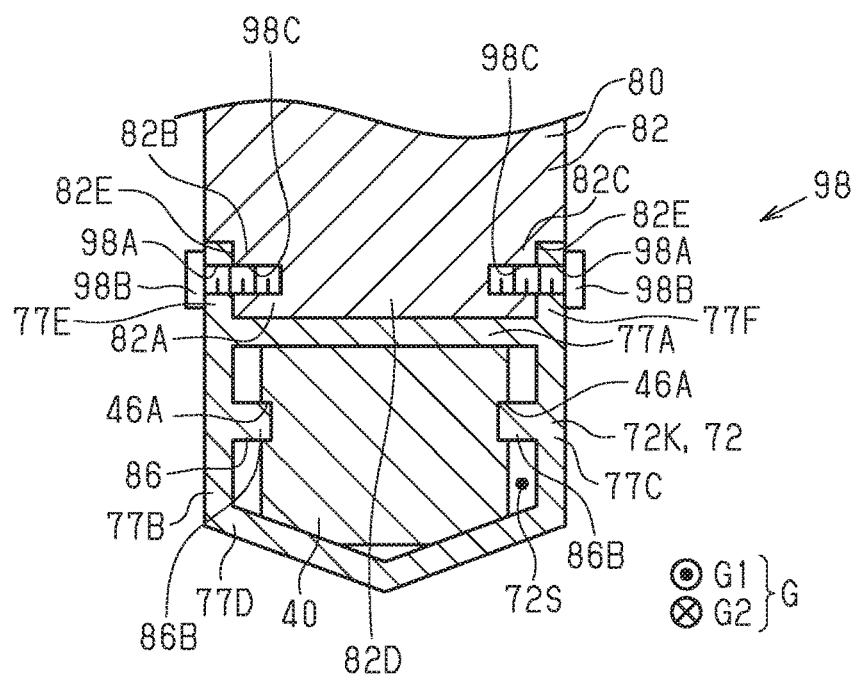
FIG. 14 is a partial cross-sectional view of a tenth example of a battery holder, a holder mount, a base, and a battery unit taken along line II-II in FIG. 2.
Figure 15:
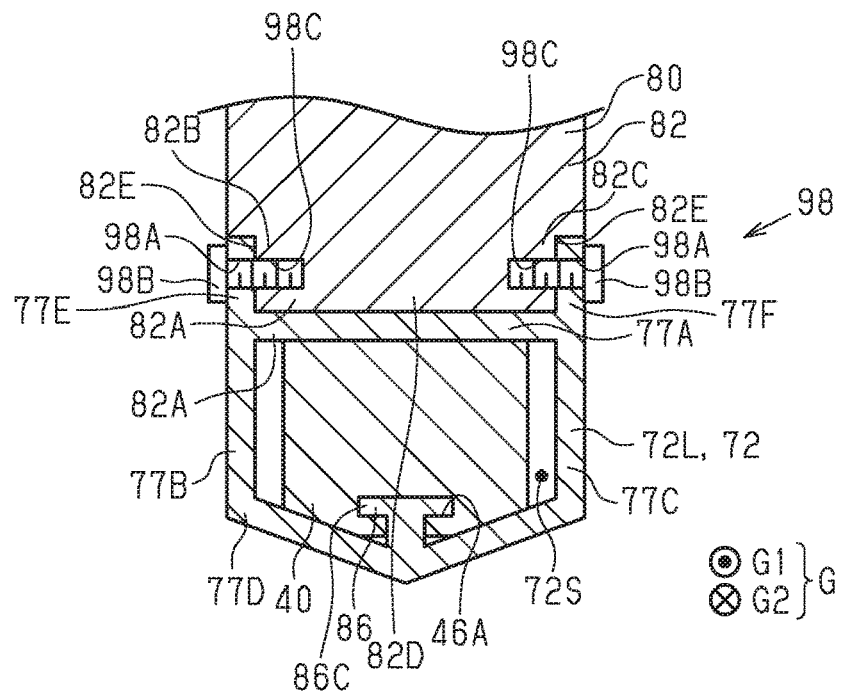
FIG. 15 is a partial cross-sectional view of an eleventh example of a battery holder, a holder mount, a base, and a battery unit taken along line II-II in FIG. 2.
Figure 16:
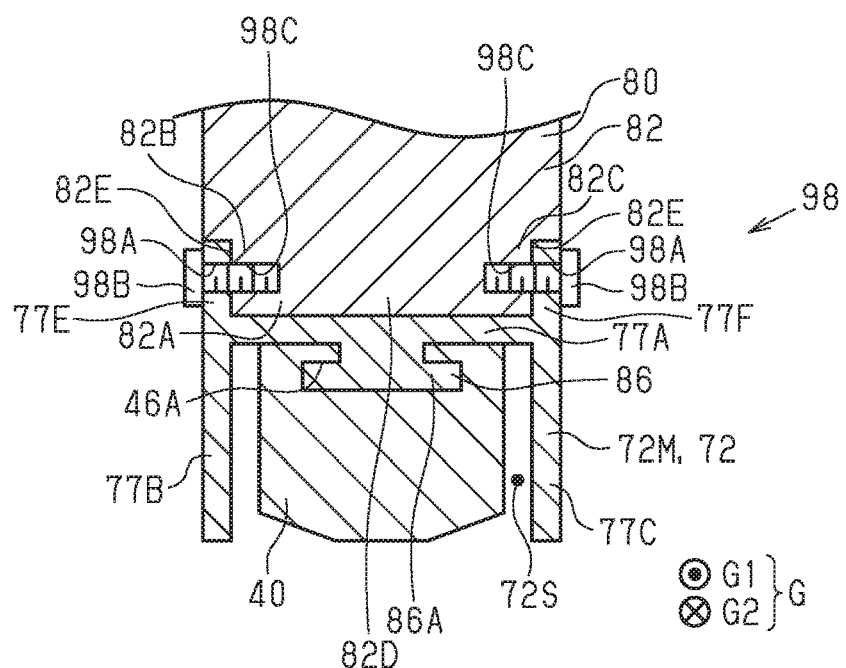
FIG. 16 is a partial cross-sectional view of a twelfth example of a battery holder, a holder mount, a base, and a battery unit taken along line II-II in FIG. 2.
Figure 17:
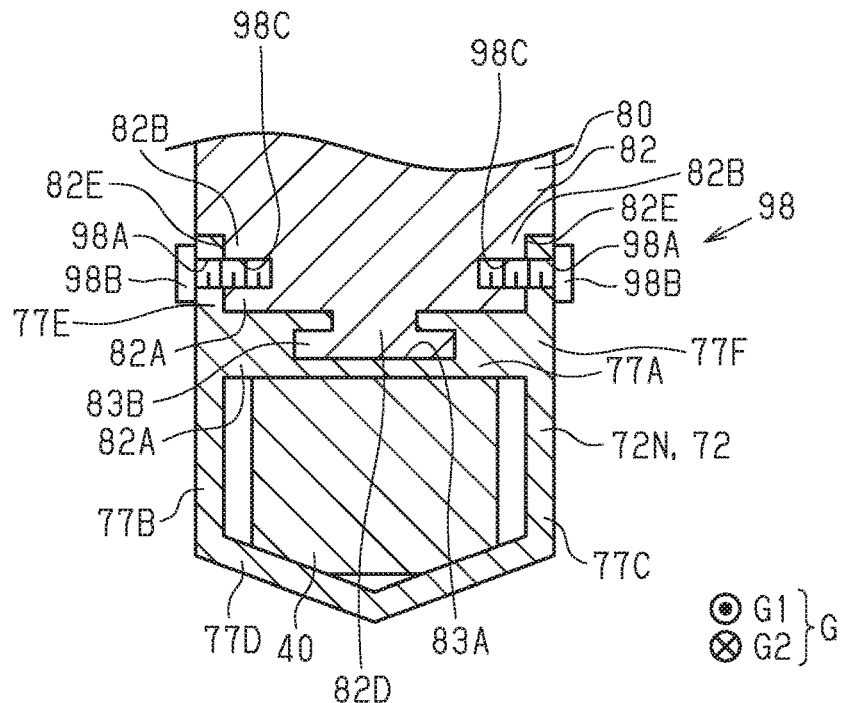
FIG. 17 is a partial cross-sectional view of a thirteenth example of a battery holder, a holder mount, a base, and a battery unit taken along line II-II in FIG. 2.

The battery holder 72J shown in FIG. 13, the battery holder 72K shown in FIG. 14, the battery holder 72L shown in FIG. 15, the battery holder 72M shown in FIG. 16, and the battery holder 72N shown in FIG. 17 each include a base connection 77A connected to the base 82 and two walls 77B and 77C projecting from the two ends, in a direction parallel to the rotational center axis C1 of the crankshaft 88, of the base connection 77A.

The battery holder 72J shown in FIG. 13, the battery holder 72K shown in FIG. 14, the battery holder 72L shown in FIG. 15, and the battery holder 72N shown in FIG. 17 each include a cover 77D connected to an end of each of the two walls 77B and 77C at the side opposite to the base connection 77A. The base connection 77A includes two first base connections 77E having the same structure as the battery holder 72E and a second base connection 77F connecting the two first base connections 77E. Preferably, the second base connection 77F is configured to abut the intermediate portion 82D of the base 82. Part of the base 82 is disposed in a space formed by the first base connections 77E and the second base connection 77F. Preferably, the intermediate portion 82D of the base on which the battery holders 72J, 72K, 72L, 72N are provided includes the flat portion 82A. The shape of the two walls 77B and 77C is similar to the shape of the two walls 73B and 73C. The shape of the cover 77D is similar to the shape of the cover 73D. Preferably, the base connection 77A and the two walls 77B and 77C are formed integrally as a one-piece structure. Preferably, the base connection 77A, the two walls 77B and 77C, and the cover 77D of the battery holders 72J, 72K, 72L, and 72N are formed integrally as a one-piece structure. The shape of the two walls 77B and 77C of the battery holder 72M shown in FIG. 16 is similar to the shape of the two walls 75B and 75C of the battery holder 72H shown in FIG. 12.

The guide 86 provided on the battery holder 72J shown in FIG. 13 and the battery holder 72M shown in FIG. 16 is provided on the base connection 77A. The guide 86 is provided in a region including the central portion of the base connection 77A in a direction parallel to the rotational center axis C1 of the crankshaft 88. The shape of the guide 86 shown in FIGS. 13 and 16 is similar to the shape of the guide 86 shown in FIG. 3. The guide 86 shown in FIGS. 13 and 16 is formed integrally with the battery holders 72J and 72M as a one-piece structure.

The guide 86 provided on the battery holder 72K shown in FIG. 14 is provided on the two walls 77B and 77C. The guide 86 shown in FIG. 14 and the guide 86 shown in FIG. 4 have similar structures.

The guide 86 provided on the battery holder 72L shown in FIG. 15 is provided on the cover 75D. The guide 86 is provided in a region including a central portion of the cover 73D in a direction parallel to the rotational center axis C1 of the crankshaft 88. The shape of the guide 86 shown in FIG. 15 is similar to the shape of the guide 86 shown in FIG. 5.

In the same manner as the battery holder 72M shown in FIG. 16, the battery holder 72J shown in FIG. 13 and the battery holder 72K shown in FIG. 14 can include the two walls 77B and 77C, and the cover 77D can be omitted.

In the battery holder 72N shown in FIG. 17, the guide 86 is formed by at least one of the base connection 77A, the two walls 77B and 77C, and the cover 77D. In the battery holder 72D shown in FIG. 17, for example, the guide 86 is configured by the base connection 73A and the cover 73D. In the battery holder 72N, a recess 83A can be provided on one of a portion of the base connection 77A facing the base 82 and a portion of the base 82 facing the base connection 77A, and a projection 83B complementary to the recess 83A can be provided on the other one of the portion of the base connection 77A facing the base 82 the portion of the base 82 facing the base connection 77A. The battery holder 72N is configured to be movable along the recess 83A or the projection 83B of the base 82. Preferably, the recess 83A and the projection 83B extend in the predetermined linear direction. Preferably, the recess 83A and the projection 83B are configured to restrict movement of the battery holder 72N in a direction intersecting the predetermined linear direction. The shape of the projection 83B is similar to, for example, the shape of the projection 86A of the guide 86 shown in FIG. 3. In the same manner as the battery holder 72N shown in FIG. 17, in the battery holder 72J shown in FIG. 13, the battery holder 72K shown in FIG. 14, the battery holder 72L shown in FIG. 15, and the battery holder 72M shown in FIG. 16, the recess 83A can be provided on one of a portion of the base connection 77A facing the base 82 and a portion of the base connection 77A facing the base 82, and the projection 83B can be provided on the other one of the portion of the base connection 77A facing the base 82 and the portion of the base connection 77A facing the base 82.

In a state in which the battery unit 40 is guided by the guide 86, the battery holder 72 is configured to hold the battery unit 40. Preferably, the battery holder 72 includes a restriction 74 that restricts movement of the battery unit 40 in the predetermined linear direction. The battery holder 72 further includes a first restriction 74A that restricts movement of the battery unit 40 in the guide direction G. Preferably, the restriction 74 includes the first restriction 74A. The first restriction 74A is configured to restrict movement of the battery unit 40 in at least the second guide direction G2. Preferably, the first restriction 74A is configured to restrict movement of the battery unit 40 in the first guide direction G1 and movement of the battery unit 40 in the second guide direction G2. The first restriction 74A engages the third restriction 48 of the battery unit 40 to restrict movement of the battery unit 40. In the present embodiment, the battery holder 72 includes two of the first restriction 74A and the battery unit 40 includes two of the third restriction 48.

Preferably, in a state in which the battery unit 40 is held by the battery holder 72, the first restrictions 74A face the battery unit 40 in a direction parallel to the rotational center axis C1 of the crankshaft 88. In a state in which the battery unit 40 is held by the battery holder 72, the first restrictions 74A can be configured to face the battery unit 40 in a direction that is orthogonal to the guide direction G and a direction parallel to the rotational center axis C1 of the crankshaft 88.

Each of the third restrictions 48 of the battery unit 40 includes a first engagement portion 48A. The first engagement portion 48A projects in a direction intersecting the longitudinal direction F of the frame 16 from an intermediate portion between two end surfaces of the housing 46 in a direction extending in the longitudinal direction F of the frame 16. The first engagement portion 48A is movable between a first position where the first engagement portion 48A restricts movement of the housing 46 in the longitudinal direction F of the frame 16 and a second position where the first engagement portion 48A is retracted from the first position to allow movement of the housing 46 in the longitudinal direction F of the frame 16. The intermediate portion of the housing 46 between the two end surfaces of the housing 46 includes portions of the housing 46 other than the two end surfaces in the longitudinal direction B. The first restriction 74A includes a second engagement portion 74B that engages the first engagement portion 48A provided on the battery unit 40. One of the first engagement portion 48A and the second engagement portion 74B includes a projection. The other one of the first engagement portion 48A and the second engagement portion 74B includes a recess.

The battery unit 40 includes two biasing portions 50 that bias the respective ones of the first engagement portions 48A toward the first position and two operating portion 52 operable by the user to move the first engagement portions 48A from the first position to the second position. Preferably, each of the biasing portions 50 includes an elastic member. Each of the biasing portions 50 includes, for example, a plate or leaf spring.

Figure 18:
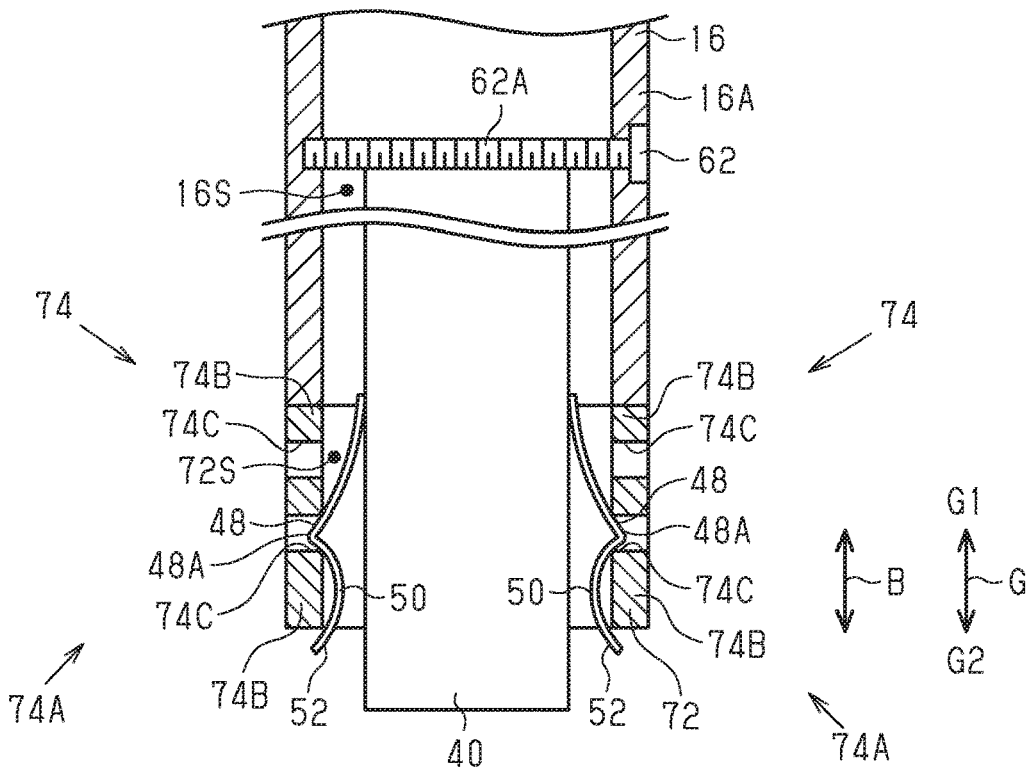
FIG. 18 is a cross-sectional view of the battery holder, the frame, and the battery unit taken along line III-III in FIG. 2 showing a state in which a first restriction restricts movement of the battery holder in a guide direction.
Figure 19:
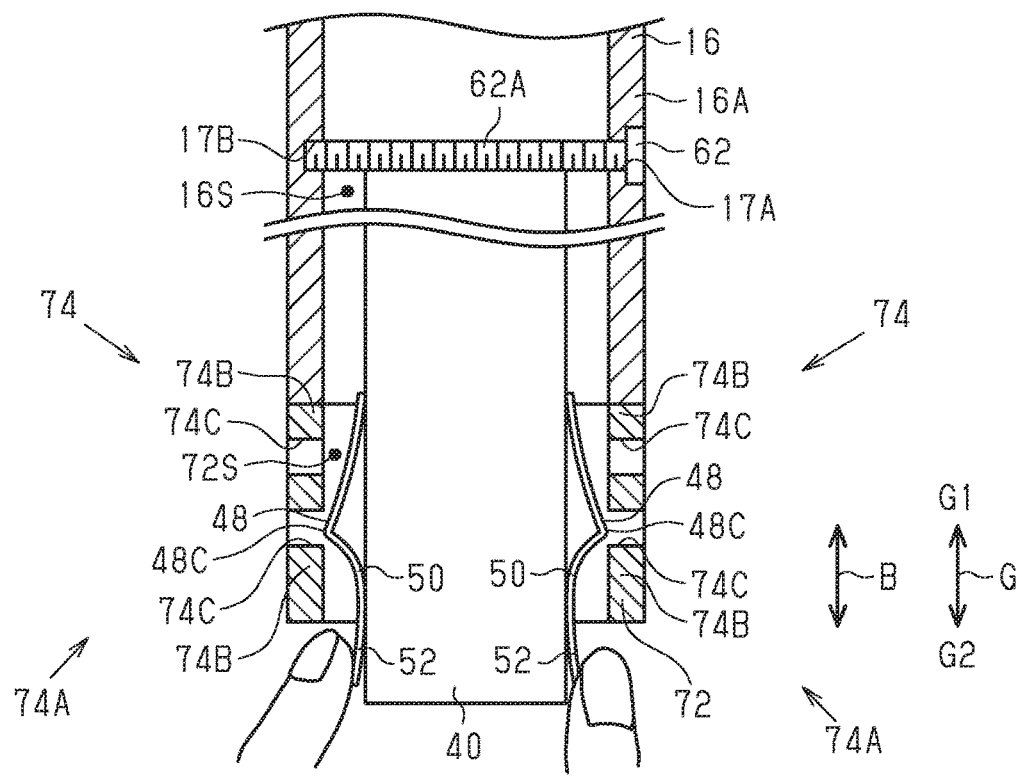
FIG. 19 is a cross-sectional view of the battery holder, the frame, and the battery unit taken along line III-III in FIG. 2 showing a state in which the first restriction allows movement of the battery holder in a guide direction.
Figure 20:
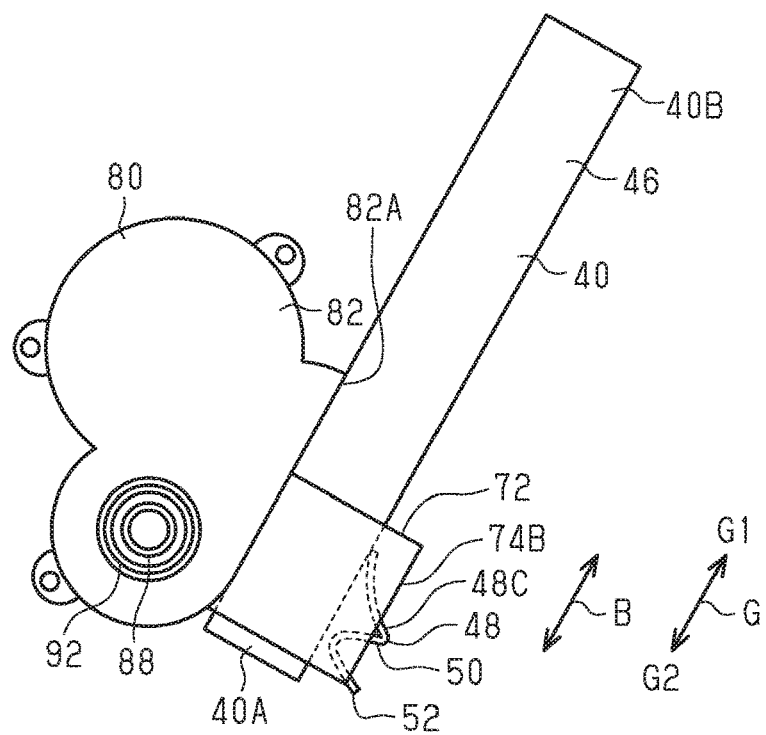
FIG. 20 is a side view of a drive unit system shown in FIG. 2 in which the first restriction is changed to a modified example.
Figure 21:
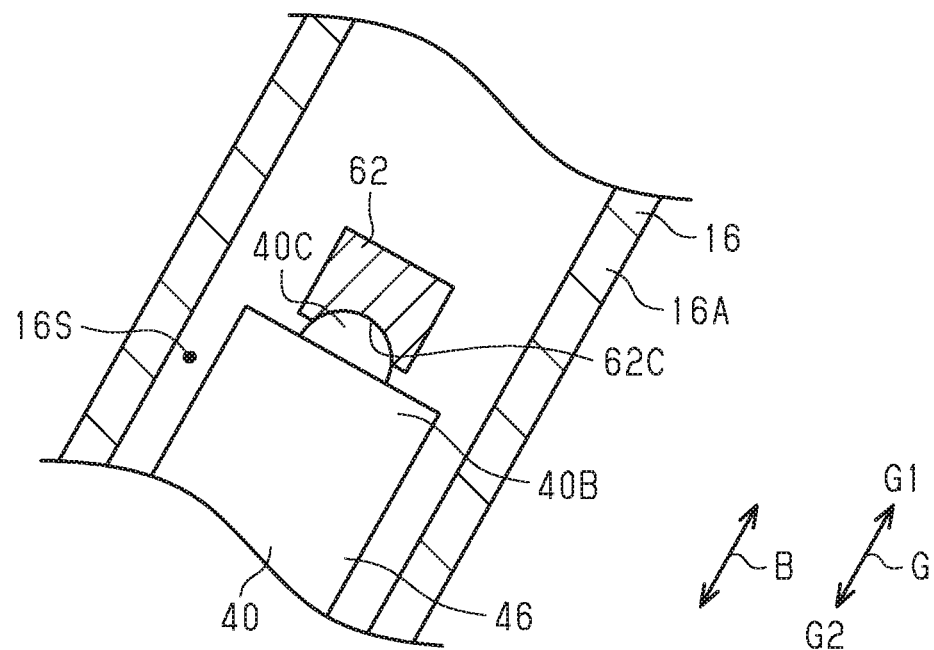
FIG. 21 is a partial cross-sectional view of the drive unit system shown in FIG. 2 in which a second restriction is changed to a modified example.
Figure 22:
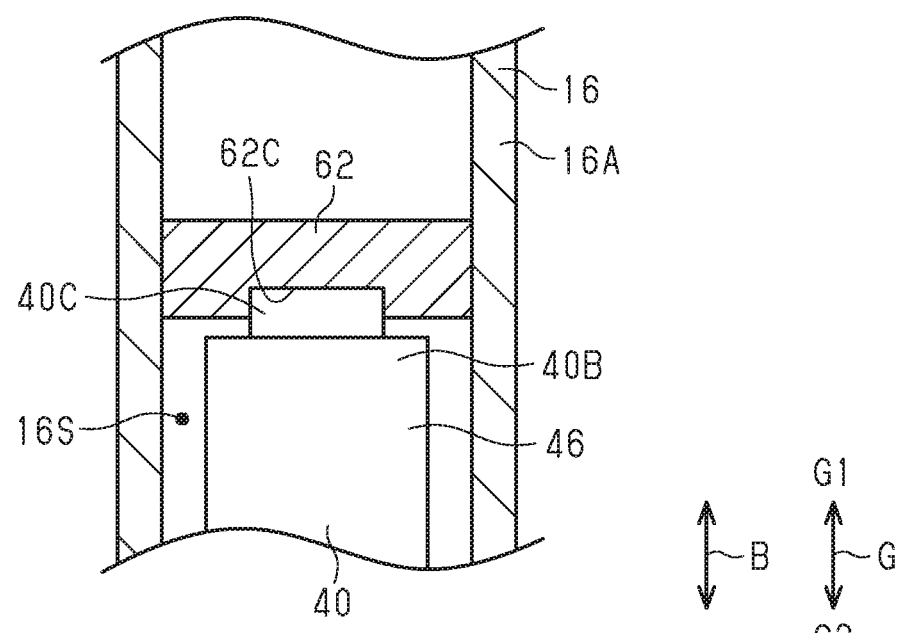
FIG. 22 is a partial cross-sectional view of the second restriction shown in FIG. 21 that is rotated 90° about an axis parallel to a longitudinal direction of the frame.

As shown in FIGS. 18 and 19, the first engagement portion 48A, the biasing portion 50, and the operating portion 52 are formed integrally as a one-piece structure. For example, a leaf spring can be bent to integrally form the first engagement portion 48A, the biasing portion 50, and the operating portion 52. In a case in which the first engagement portion 48A and the operating portion 52 are formed integrally, the biasing portion 50 can be configured to be a body separate from the first engagement portion 48A and the operating portion 52. In this case, the biasing portion 50 can include, for example, a coil spring instead of a leaf spring. Preferably, the first engagement portion 48A, the biasing portion 50, and the operating portion 52 are provided on a side surface of the housing 46 extending in the longitudinal direction B. Preferably, the first engagement portion 48A, the biasing portion 50, and the operating portion 52 are provided on two side surfaces of the housing 46 extending in a direction intersecting the longitudinal direction B. As shown in FIG. 20, alternatively, only one first engagement portion 48A, only one biasing portion 50, and only one operating portion 52 can be provided on the housing 46.

In the present embodiment, the battery holder 72 holds the battery unit 40 so that a portion including the end surface of the first end 40A of the housing 46 is exposed from the battery holder 72 as viewed in a direction parallel to the rotational center axis C1 of the crankshaft 88. The battery holder 72 can hold the battery unit 40 so that the first end 40A of the housing 46 is not exposed from the battery holder 72 as viewed in a direction parallel to the rotational center axis C1 of the crankshaft 88. In a state in which the battery unit 40 is held by the battery holder 72, the operating portion 52 is provided on the first end 40A of the housing 46 so that at least part of the operating portion 52 is exposed from the battery holder 72. The first engagement portion 48A is provided on an intermediate portion between the biasing portion 50 and the operating portion 52 in the longitudinal direction B of the battery unit 40. The first engagement portion 48A includes a bent portion 48C provided on an intermediate portion of the biasing portion 50 in the longitudinal direction B of the battery unit 40. The second engagement portion 74B of the battery holder 72 includes a hole 74C. Preferably, the second engagement portion 74B includes a plurality of holes 74C lined in the longitudinal direction F of the frame 16.

As shown in FIG. 19, in a case in which the user operates the operating portions 52, the biasing portions 50 deform to decrease the projecting amount of the first engagement portions 48A from the housing 46 and disengage the first engagement portions 48A from the second engagement portions 74B. Preferably, each of the first engagement portion 48A is configured to be disengaged from a corresponding one of the second engagement portions 74B in a case in which the battery unit 40 is moved in the first guide direction G1. This eliminates the need for operating the operating portions 52 to disengage the first engagement portions 48A from the second engagement portions 74B in a case in which the battery unit 40 is moved in the first guide direction G1. This facilitates attachment of the battery unit 40 to the battery holder 72. For example, the leaf spring configuring the biasing portion 50 is configured to be separated from the housing 46 from the upstream side toward the downstream side in the first guide direction G1. As a result, in a case in which the battery unit 40 is moved in the first guide direction G1, the inner wall surface of the guide 86 presses the biasing portions 50, and the first engagement portions 48A are disengaged from the second engagement portions 74B. In a case in which the user does not operate the operating portions 52, the first engagement portions 48A are biased toward the outer side of the housing 46. In a case in which the first engagement portions 48A are located at a position corresponding to one of the holes 74C in the second engagement portions 74B, the first engagement portions 48A are fitted into the corresponding one of the holes 74C of the first restrictions 74A to restrict movement of the battery unit 40. In the present embodiment, in a case in which the first engagement portions 48A are fitted into the corresponding one of the holes 74C in the first restrictions 74A, movement of the battery unit 40 in the second guide direction G2 is restricted.

The second restriction 62 can be configured in various shapes. The second restriction 62 can be configured to restrict movement of the battery unit 40 in a direction intersecting the first guide direction G1 in addition to restricting movement of the battery unit 40 in the first guide direction G1. The second restriction 62 includes, for example, one of a projection and a recess. The second restriction 62 can be bolted to the frame 16 or welded to the frame 16. Preferably, the second end 40B of the battery unit 40 includes one of the projection and the recess that is complementary to the shape of the other one of the projection and the recess included in the second restriction 62. The second restriction 62 shown in each of FIGS. 21 and 22 includes a recess 62C, and the second end 40B of the battery unit 40 includes a projection 40C. Insertion of the projection 40C into the recess 62C restricts movement of the battery unit 40 in a direction intersecting the longitudinal direction of the frame 16. The wall surface of the recess 62C is formed to decrease in size from the opening toward the bottom surface in a plane that is parallel to the longitudinal direction F of the frame 16 and orthogonal to the rotational center axis C1 of the crankshaft 88. The wall surface of the recess 62C is formed to be U-shaped in a plane that is parallel to the longitudinal direction F of the frame 16 and orthogonal to the rotational center axis C1 of the crankshaft 88. For example, an elastic member formed from an elastic resin such as a synthetic rubber or an elastomer can be provided on one of a portion of the second restriction 62 that contacts the battery unit 40 and a portion of the battery unit 40 that contacts the second restriction 62.

Preferably, the drive unit 80 further includes the electrical connector 94 electrically connecting the battery unit 40 and the motor 90. Preferably, the electrical connector 94 is located closer to the rotational center axis C1 of the crankshaft 88 than the rotational center axis C2 of the motor 90. The electrical connector 94 is provided on the base 82. An electrical connector 44 provided on the battery unit 40 is attachable to and detachable from the electrical connector 94. The electrical connector 44 is provided on the first end 40A of the battery unit 40. The electrical connector 44 is provided on an end surface of the first end 40A of the battery unit 40 in the longitudinal direction B of the battery unit 40.

Figure 2:
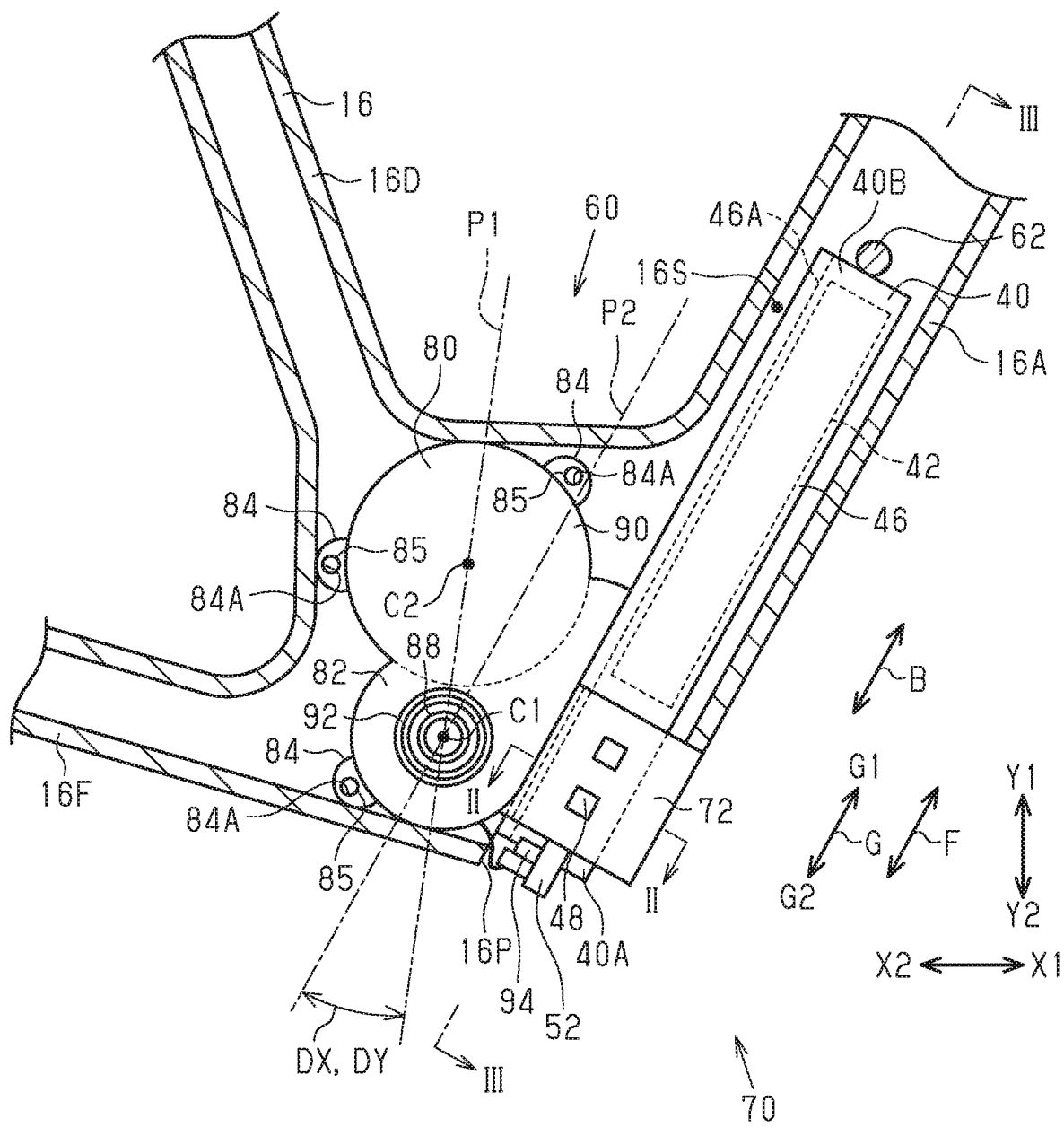
FIG. 2 is a partial cross-sectional view of a frame of the human-powered vehicle shown in FIG. 1.
Figure 23:
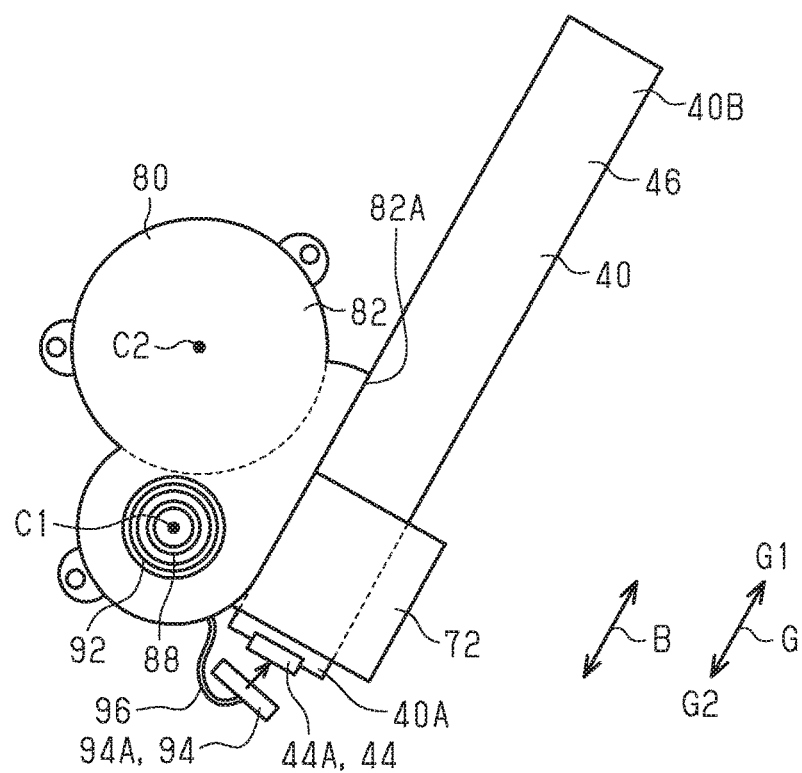
FIG. 23 is a side view of the drive unit system shown in FIG. 2 in which an electrical connector of the drive unit is connected to an electrical connector of the battery unit.

As shown in FIGS. 2 and 23, for example, the electrical connector 94 can include an electrical connector 94A, and the electrical connector 44 can include an electrical connector 44A. The drive unit 80 includes the battery holder 72 provided on the base 82 and configured to hold the battery unit 40 and an electrical cable 96 extending from the base 82 and electrically connected to the electrical connector 94A. In a state in which the battery unit 40 is held by the battery holder 72, the electrical connector 94A is provided on a portion of the base 82 where the electrical connector 94A can be joined with the electrical connector 44A provided on the battery unit 40. The electrical cable 96 is electrically connected to a circuit board provided on the base 82. The electrical connector 94A is coupled to one end of the electrical cable 96. The other end of the electrical cable 96 can be provided, for example, in the housing 46. The other end of the electrical cable 96 can be attachably and detachably connected to an electrical connector connected to an electrical connector provided on the peripheral portion of the housing 46. The electrical cable 96 allows movement of the electrical connector 94A relative to the base 82. Thus, the electrical connector 94A can be connected to the electrical connector 44A at a plurality of positions in the guide direction G of the electrical connector 94A.

Figure 24:
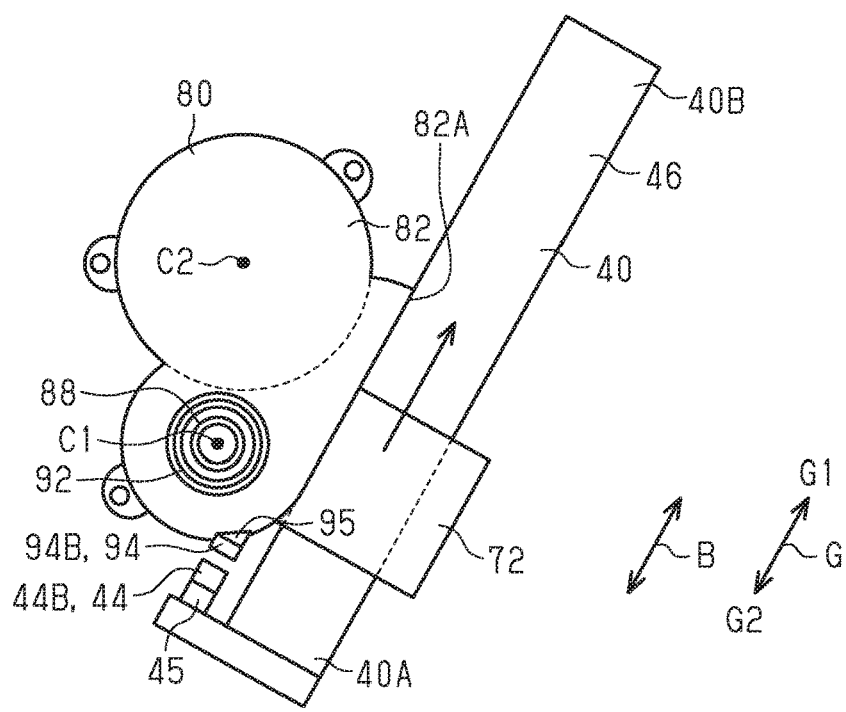
FIG. 24 is a side view of a drive unit system shown in FIG. 23 in which the electrical connector is changed to a first modified example.

As shown in FIG. 24, for example, the electrical connector 94 can include an electrical connector 94B, and the electrical connector 44 can include an electrical connector 44B. In a case in which the battery unit 40 is held by the battery holder 72, the electrical connector 94B is configured to be electrically connected to the battery unit 40. In a state in which the battery unit 40 is held by the battery holder 72, the electrical connector 94B is provided on the portion of the base 82 where the electrical connector 94B can be joined with the electrical connector 44B provided on the battery unit 40. In the base 82, preferably, in a state in which the battery unit 40 is held by the battery holder 72, the electrical connector 44B is provided on a portion of the base 82 configured to face the electrical connector 94B in the guide direction G. Preferably, at least one of the electrical connector 94B and the electrical connector 44B is configured to be movable in the guide direction G. Movement of at least one of the electrical connector 94B and the electrical connector 44B in the guide direction G allows the electrical connector 94B to be connected to the electrical connector 44B at a plurality of positions in the guide direction G. At least one of the electrical connector 94B and the electrical connector 44B is mounted on a mounting subject by an elastic member. In FIG. 24, for example, the electrical connector 94B is mounted on the base 82 by an elastic member 95. For example, the electrical connector 44B can be mounted on the base 82 by an elastic member 45. The elastic members 95 and 45 include, for example, an elastomer or a coil spring. In a case in which the elastic members 95 and 45 are compressed, the position of the electrical connector 94B or the electrical connector 44B relative to the mounting subject is changed. Thus, the electrical connector 94B is electrically connected to the electrical connector 44B in a preferred manner.

Figure 25:
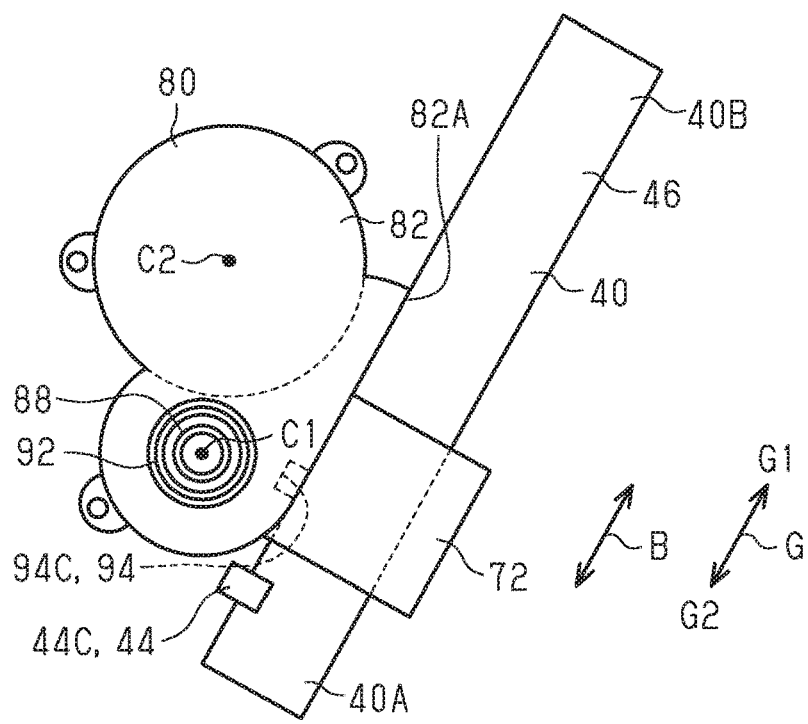
FIG. 25 is a side view of a drive unit system shown in FIG. 23 in which the electrical connector is changed to a second modified example.
Figure 26:
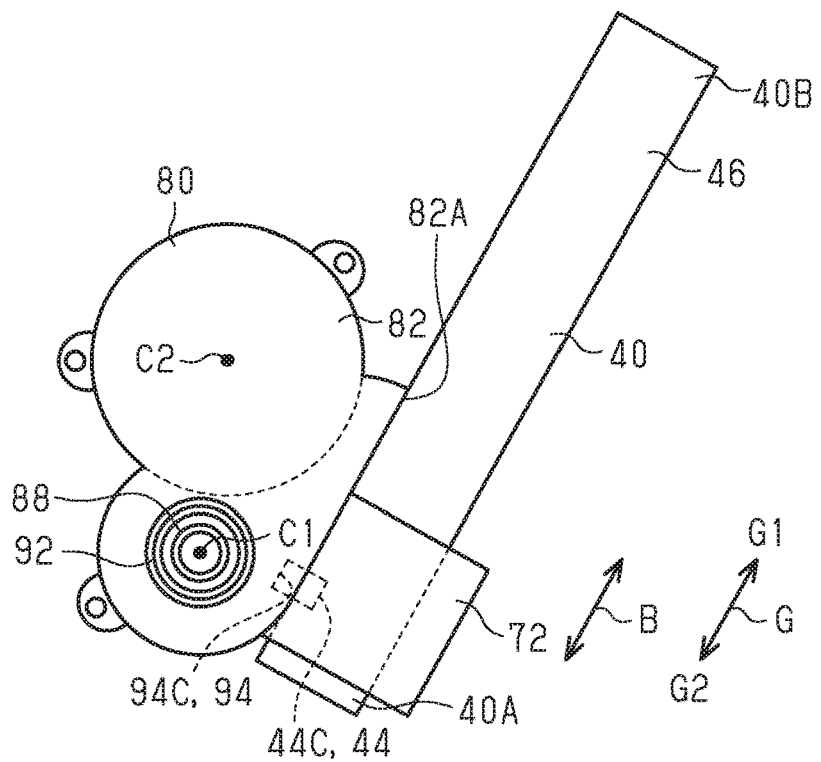
FIG. 26 is a side view of the drive unit shown in FIG. 25 in which the electrical connector is connected to the electrical connector of the battery unit.

As shown in FIGS. 25 and 26, for example, the electrical connector 94 can include an electrical connector 94C, and the electrical connector 44 can include an electrical connector 44C. The electrical connector 94C is configured to be electrically connected to the battery unit 40 in a case where at least part of the battery unit 40 is arranged in the accommodation cavity 72S. Preferably, in a state in which the battery unit 40 is held by the battery holder 72, the electrical connector 94C is configured to be electrically connected to the battery unit 40. Preferably, a connection terminal of one of the electrical connector 94C and the electrical connector 44C includes a recess, and a connection terminal of the other one of the electrical connector 94C and the electrical connector 44C includes a projection. Preferably, the recess includes two or more recesses. The projection includes, for example, a pogo pin. The electrical connector 44C is provided on a side portion of the battery unit 40. The electrical connector 94C is provided, for example, on the battery holder 72 or a base. In a state in which the battery unit 40 is held by the battery holder 72, the connection terminal of one of the electrical connector 94C and the electrical connector 44C are provided at a position of contact with the connection terminal of the other one of the electrical connector 94C and the electrical connector 44C. Thus, in a case in which the battery unit 40 is held by the battery holder 72, the electrical connector 94C and the electrical connector 44C are automatically connected.

Second Embodiment

A second embodiment of the drive unit 80, the drive system 60, and the battery unit 40 for the human-powered vehicle 10 will now be described with reference to FIGS. 27 to 33. The drive unit 80, the drive system 60, and the battery unit 40 of the second embodiment are the same as the drive unit 80, the drive system 60, and the battery unit 40 of the first embodiment, except for use of a battery holder 102 and the shape of the second restriction 62. The same reference characters are given to those elements that are the same as the corresponding elements of the first embodiment. Such elements will not be described in detail.

The drive system 60 includes a battery holding device 100. The battery holding device 100 includes a battery holder 102 that can be mounted on the drive unit 80 for the human-powered vehicle 10 provided with the crankshaft 88 at a plurality of positions in the predetermined linear direction. The battery holder 102 is provided on the base 82 and configured to hold the battery unit 40.

The battery holder 102 is configured to hold the first end 40A of the battery unit 40. The battery holder 102 includes a restriction 104 that restricts movement of the battery unit 40 in the predetermined linear direction. The restriction 104 restricts movement of the battery unit 40 in the longitudinal direction F of the frame 16. The restriction 104 is configured to restrict movement of the battery unit 40 in at least a second direction F2 of the longitudinal direction F of the frame 16. In a state in which the battery unit 40 is held by the battery holder 102, the restriction 104 faces the battery unit 40 in a direction intersecting a direction parallel to the rotational center axis C1 of the crankshaft 88. The restriction 104 includes a surface configured to contact the first end 40A of the battery holder 102. The restriction 104 supports the end surface of the first end 40A of the battery unit 40 in the longitudinal direction B of the battery unit 40 to restrict movement of the battery unit 40 in the second direction F2.

Preferably, the battery holding device 100 further includes a second restriction 106. The second restriction 106 is configured to hold the second end 40B. The second restriction 106 restricts movement of the battery unit 40 in the predetermined linear direction. The second restriction 106 restricts movement of the battery unit 40 in the longitudinal direction F of the frame 16. The second restriction 106 is configured to restrict movement of the battery unit 40 in at least a first direction F1 of the longitudinal direction F of the frame 16. The second restriction 106 supports the end surface of the battery unit 40 located toward the second end 40B in the longitudinal direction B of the battery unit 40 to restrict movement of the battery unit 40 in the first direction F1. The second restriction 106 is coupled to the frame 16, for example, by bolts or through welding.

Figure 27:
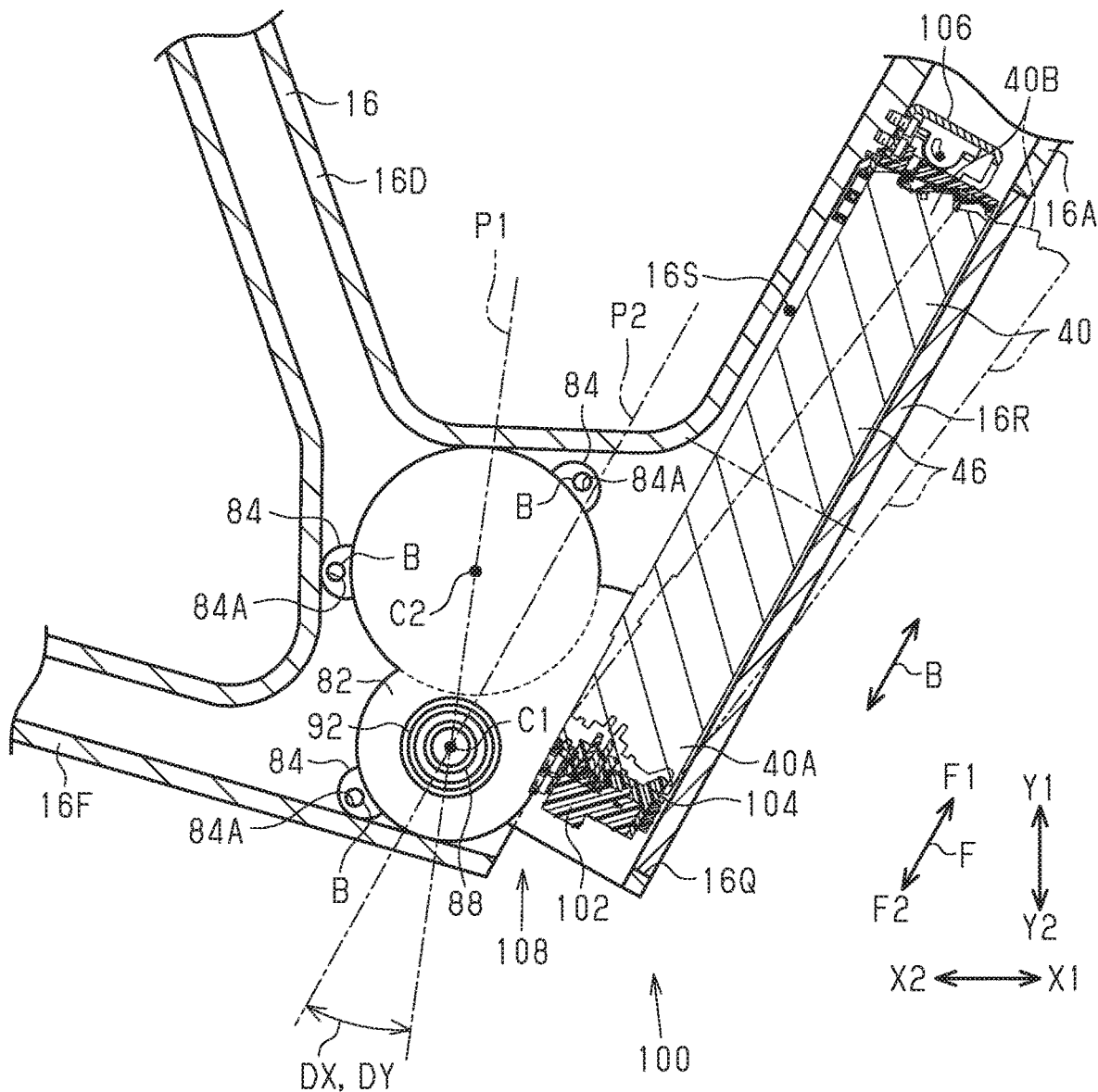
FIG. 27 is a partial cross-sectional view of a frame of a human-powered vehicle including a drive unit for a human-powered vehicle and a battery holding device for a human-powered vehicle in accordance with a second embodiment.
Figure 28:
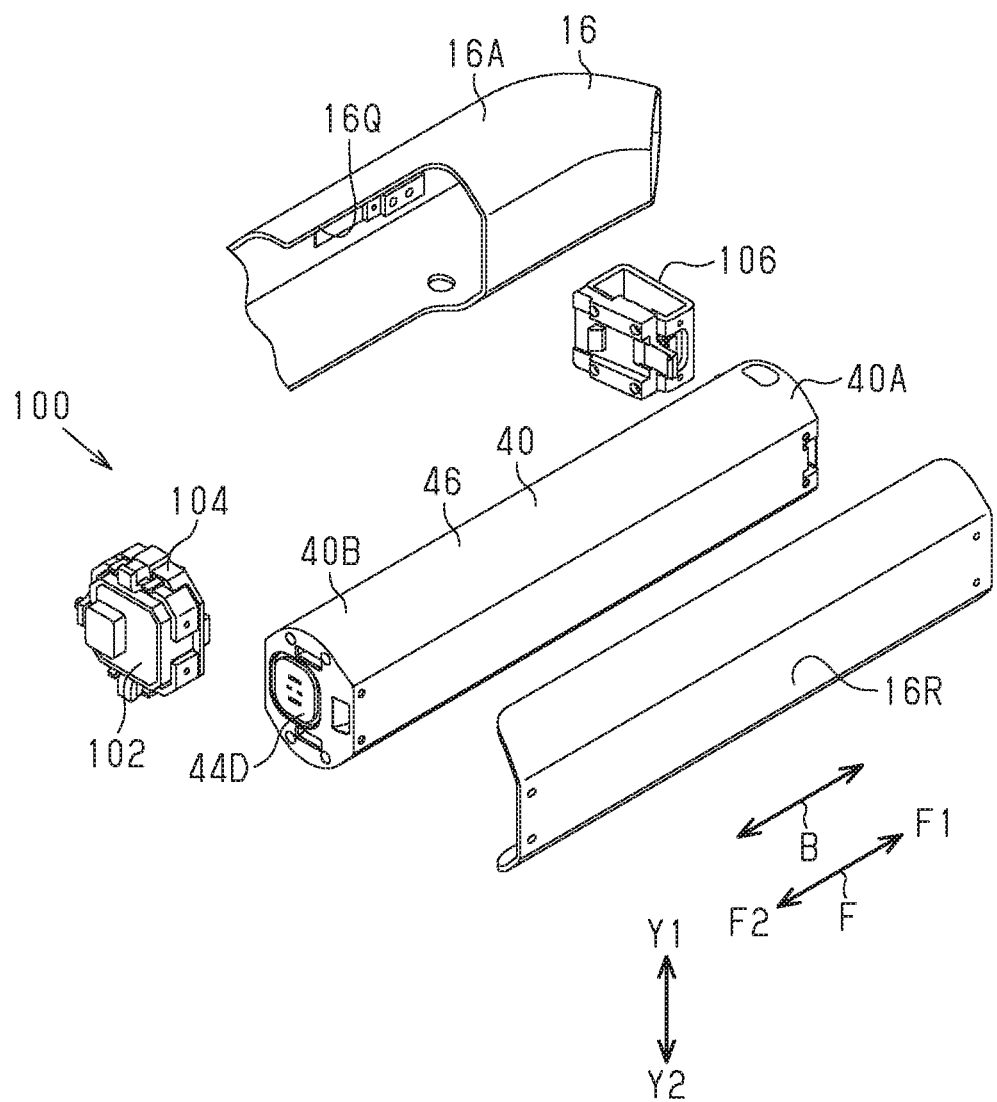
FIG. 28 is an exploded perspective view of the human-powered vehicle drive unit, the human-powered vehicle battery holding device, and the battery unit shown in FIG. 27.

Preferably, the frame 16 includes an opening 16Q that allows the battery unit 40 to be inserted into the battery receptacle 16S in a direction orthogonal to the longitudinal direction F of the frame 16. A cover 16R is attached to the frame 16 to cover the opening 16Q. The cover 16R is, for example, bolted to the frame 16. The cover 16R can be attached to the battery unit instead of the frame 16. As indicated by the double-dashed lines in FIG. 27, in a state in which the battery holder 102 is in contact with the end surface located toward the first end 40A, the second end 40B is moved toward the battery receptacle 16S so that the battery unit 40 is disposed in the battery receptacle 16S. In a state in which the battery unit 40 is held between the battery holder 102 and the second restriction 106, the user can remove the battery unit 40 from the frame 16 by pivoting the battery unit 40 about the end surface located toward the first end 40A and moving the second end 40B out of the battery receptacle 16S. In FIG. 27, the opening 16Q is formed in a lower portion of the frame 16. Instead, the opening 16Q can be formed in a side surface of the frame.

Preferably, the battery holder 102 includes an electrical connector 94D. The electrical connector 94D is configured to be electrically connected to an electrical connector 44D provided on the end surface of the battery unit 40 located toward the first end 40A. Preferably, one of the electrical connector 94D and the electrical connector 44D includes a projection, and the other one of the electrical connector 94D and the electrical connector 44D includes a recess.

The drive unit 80 includes the base 82 and a holder mount 108. The holder mount 108 is configured to selectively mount the battery holder 102 at a plurality of positions in the predetermined linear direction. Preferably, the drive unit 80 further includes the battery holder 102. Preferably, the predetermined linear direction includes a direction intersecting a direction in which the crankshaft 88 extends. Preferably, the predetermined linear direction is orthogonal to the direction in which the crankshaft 88 extends. Preferably, in a state in which the battery holder 102 is mounted on the frame 16 of the human-powered vehicle 10, the predetermined linear direction extends in the longitudinal direction F of the frame 16 of the human-powered vehicle 10. Preferably, the predetermined linear direction extends in a direction in which the down tube 16A extends.

Preferably, the holder mount 108 and the frame mount 84 are located at different positions as viewed in a direction in which the crankshaft 88 extends. The holder mount 108 is provided on the flat portion 82A. The flat surface includes a surface parallel to the down tube 16A. Preferably, the holder mount 108 is provided in the vicinity of the opening 16P of the frame 16. Preferably, at least part of the frame mount 84 is provided toward the upper side Y1 of the human-powered vehicle 10 from the holder mount 108. The battery holder 102 and the frame mount 84 are configured to be mounted on the drive unit 80 at different positions as viewed in a direction in which the crankshaft 88 extends. The battery holder 102 and the frame mount 84 are configured to be mounted on the base 82 of the drive unit 80 at different positions as viewed in a direction in which the crankshaft 88 extends.

Preferably, the holder mount 108 includes at least one of a male thread, a female thread, and an elongated hole that extends in the predetermined linear direction. Preferably, at least part of the holder mount 108 is integral with the base 82 as a one-piece structure. The holder mount 108 is configured to be non-movable in the predetermined linear direction. The holder mount 108 includes a member formed integrally with the base 82 and configured to be non-movable in the predetermined linear direction.

Figure 29:
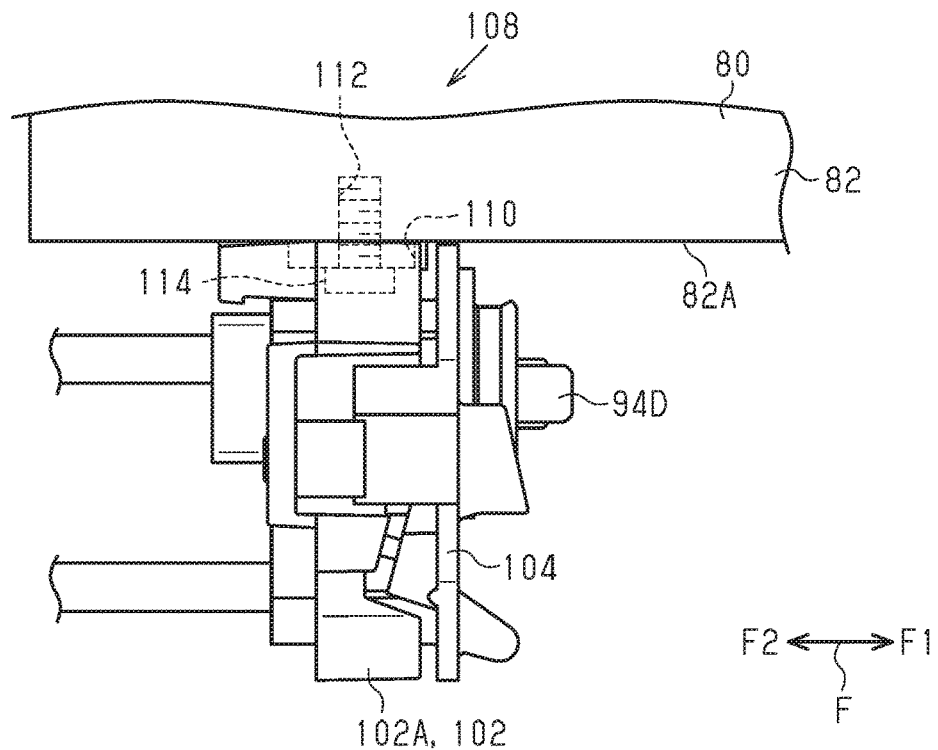
FIG. 29 is a side view showing a first example of a battery holding device for a human-powered vehicle shown in FIG. 27.

FIG. 29 shows a battery holder 102A, which is an example of the battery holder 102. The battery holder 102A includes an elongated hole 110 that extends in the predetermined linear direction. A male threaded fastener 114 having a male thread is inserted into the elongated hole 110 and joined with a threaded hole 112 having a female thread of the drive unit 80. The holder mount 108 includes the elongated hole 110 and the male threaded fastener 114 that is inserted into the elongated hole 110. The elongated hole 110, the threaded hole 112 having the female thread, and the male threaded fastener 114 having the male thread constitute the holder mount 108. The threaded hole 112 having the female thread is formed integrally with the base 82 as a one-piece structure. The holder mount 108 is configured to allow the portion of the elongated hole 110 where the male threaded fastener 114 is inserted to be changed so that the battery holder 102A can be mounted at a plurality of positions in the predetermined linear direction.

Figure 30:
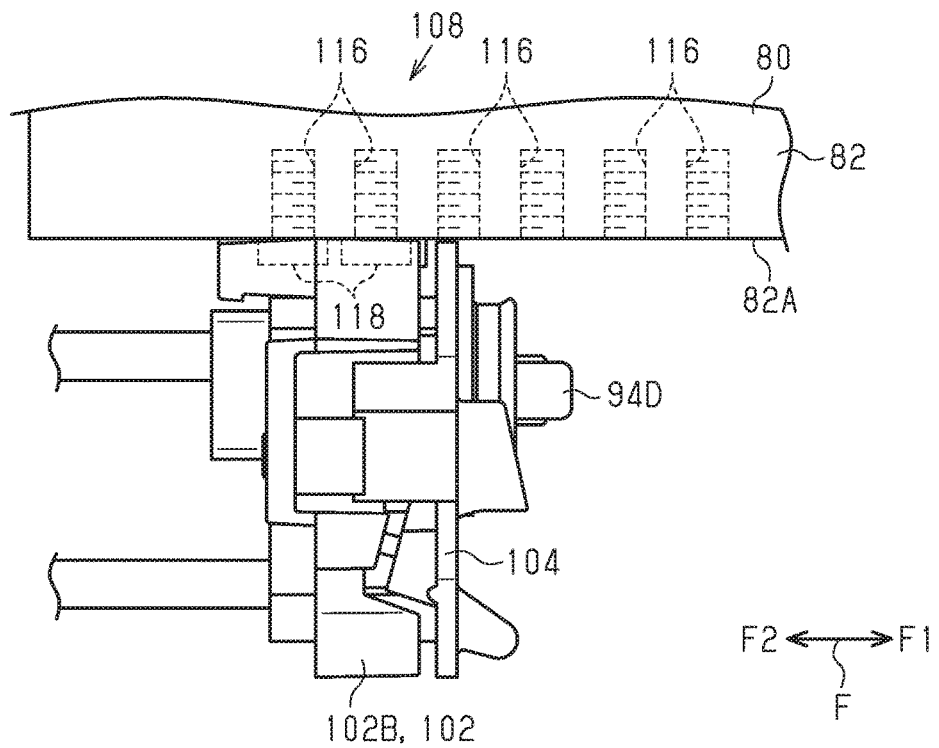
FIG. 30 is a side view showing a second example of a battery holding device for a human-powered vehicle shown in FIG. 27.

FIG. 30 shows a battery holder 102B, which is an example of the battery holder 102. The battery holder 102B includes a male threaded fastener 118 having the male thread joined with one of a plurality of female threaded holes 116 of the drive unit 80 aligned in the predetermined linear direction. The female threaded holes 116 and the male threaded fastener 118 constitute the holder mount 108. The female threaded holes 116 with the female threads are formed integrally with the base 82 as a one-piece structure. The holder mount 108 is configured to allow the female threaded holes 116 into which the male threaded fastener 118 is inserted to be changed so that the battery holder 102B can be mounted at a plurality of positions in the predetermined linear direction.

Figure 31:
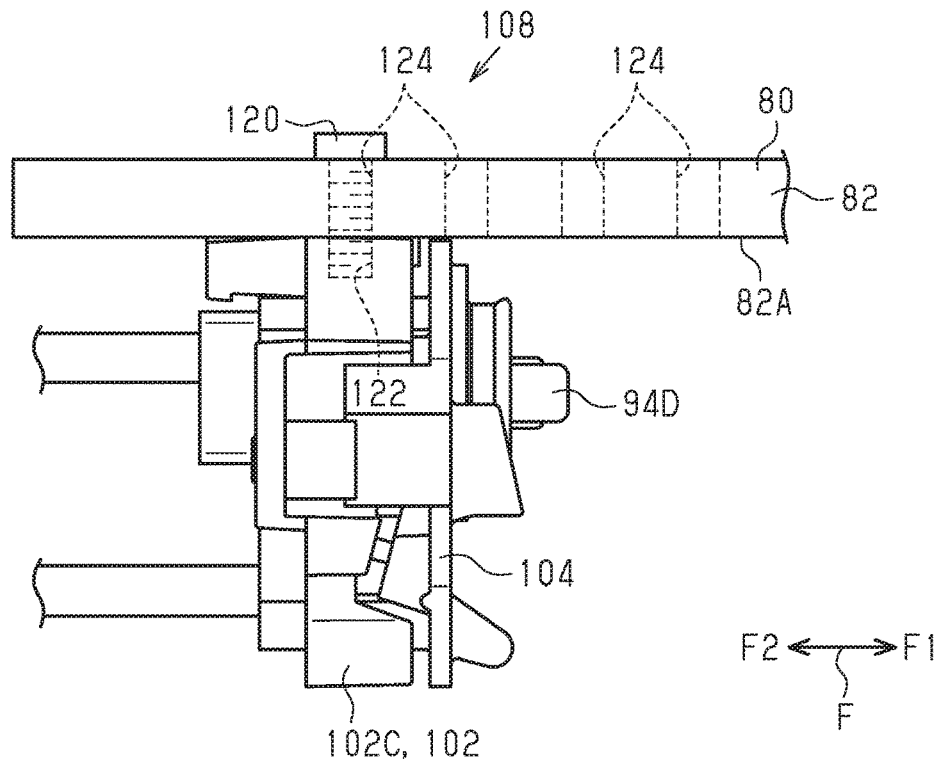
FIG. 31 is a side view showing a third example of a battery holding device for a human-powered vehicle shown in FIG. 27.

FIG. 31 shows a battery holder 102C, which is an example of the battery holder 102. The battery holder 102C includes a female threaded hole 122 joined with a male threaded fastener 120 of the drive unit 80. The base 82 of the drive unit 80 includes a plurality of holes 124 lined in the predetermined linear direction. The male threaded fastener 120, the female threaded hole 122, and the holes 124 configure the holder mount 108. The holes 124 are formed integrally with the base 82. The holder mount 108 is configured to allow the hole 124 into which the male threaded fastener 120 is inserted to be changed so that the battery holder 102C can be mounted at a plurality of positions in the predetermined linear direction.

Figure 32:
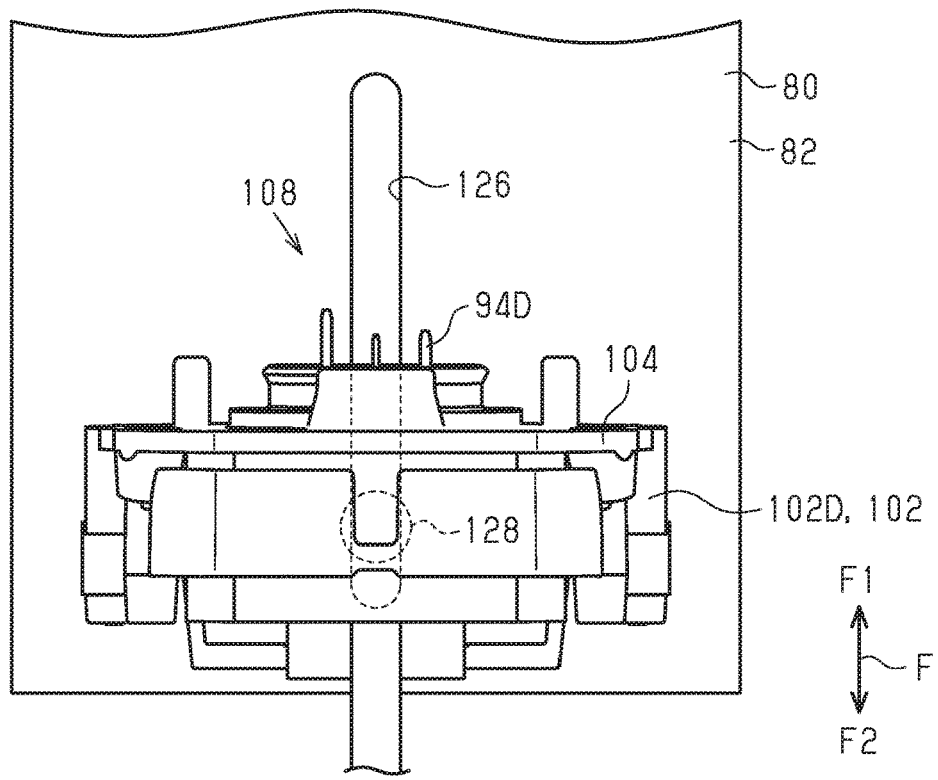
FIG. 32 is a bottom view of the battery holding device for a human-powered vehicle shown in FIG. 31.
Figure 33:
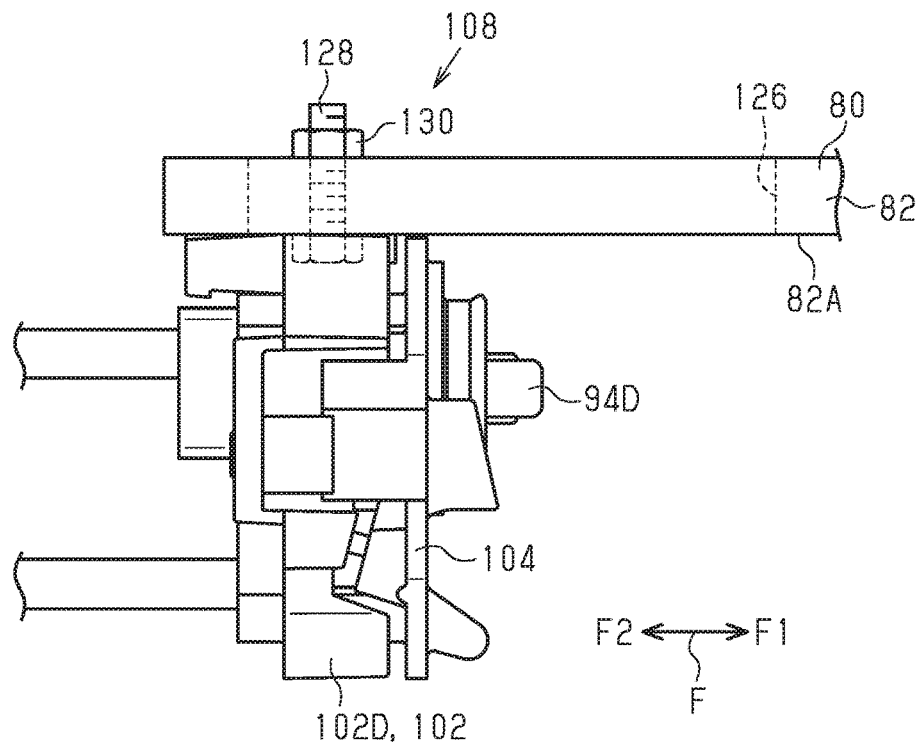
FIG. 33 is a side view showing a fourth example of a battery holding device for a human-powered vehicle shown in FIG. 27.

FIGS. 32 and 33 show a battery holder 102D, which is an example of the battery holder 102. The battery holder 102D includes a male threaded fastener 128 inserted into an elongated hole 126 that extends in the predetermined linear direction of the drive unit 80. The male threaded fastener 128 is inserted into the elongated hole 126, and a nut 130 is fastened to the male threaded fastener 128. The holder mount 108 includes the elongated hole 126 and the male threaded fastener 128, which is inserted into the elongated hole 126. The elongated hole 126, the male threaded fastener 128, and the nut 130 configure the holder mount 108. The elongated hole 126 is formed integrally with the base 82. The holder mount 108 is configured to allow the portion of the elongated hole 126 where the male threaded fastener 128 is inserted to be changed so that the battery holder 102D can be mounted at a plurality of positions in the predetermined linear direction.

Modified Examples

The description related with the above embodiment exemplifies, without any intention to limit, applicable forms of a drive unit for a human-powered vehicle, a drive system for a human-powered vehicle, and a battery unit for a human-powered vehicle according to the present disclosure. The drive unit for a human-powered vehicle, the drive system for a human-powered vehicle, and the battery unit for human-powered vehicle according to the present disclosure is applicable to, for example, modified examples of the above embodiment that are described below and combinations of at least two of the modified examples that do not contradict each other. In the following modified examples, the same reference characters are given to those elements that are the same as the corresponding elements of the above embodiment. Such elements will not be described in detail.

Figure 34:
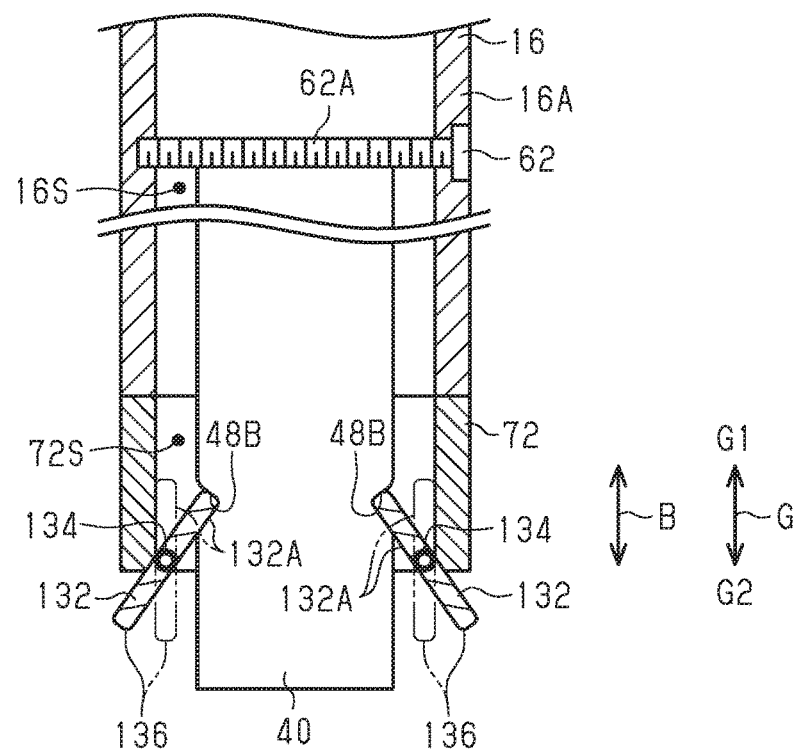
FIG. 34 is a cross-sectional view showing a first modified example of the first restriction in accordance with the first embodiment.

Each of the first restrictions 74A can be changed to a first restriction 132 shown in FIG. 34. The first restrictions 132 are configured to be switched between a first state in which the first restrictions 132 restrict movement of the battery unit 40 in the second guide direction G2 and a second state in which the first restrictions 132 restrict movement of the battery unit 40 in the second guide direction G2. Preferably, each of the first restrictions 132 includes an elastic member 134. Preferably, the drive unit 80 further includes an operating portion 136 operable by the user to switch the first restriction 74A between the first state and the second state. The operating portion 136 can be provided integrally with the first restriction 132 as a one-piece structure. Each of the first restriction 132 includes a second engagement portion 132A that engages a first engagement portion 48B provided on the battery unit 40. One of the first engagement portion 48B and the second engagement portion 132A includes a projection. The other one of the first engagement portion 48B and the second engagement portion 132A includes a recess. In a state in which the battery unit 40 is held by the battery holder 72, the first restrictions 132 face the battery unit 40 in a direction parallel to the rotational center axis C1 of the crankshaft 88. For example, at least the second engagement portions 132A of the first restrictions 132 are disposed on the wall surface of the accommodation cavity 72S of the battery holder 72. The elastic members 134 include, for example, a coil spring. The elastic members 134 bias the second engagement portions 132A toward the battery unit 40 disposed in the accommodation cavity 72S of the battery holder 72. The user can operate the operating portions 136 provided on the ends of the first restrictions 132 to move the second engagement portions 132A away from the battery unit 40.

Figure 35:
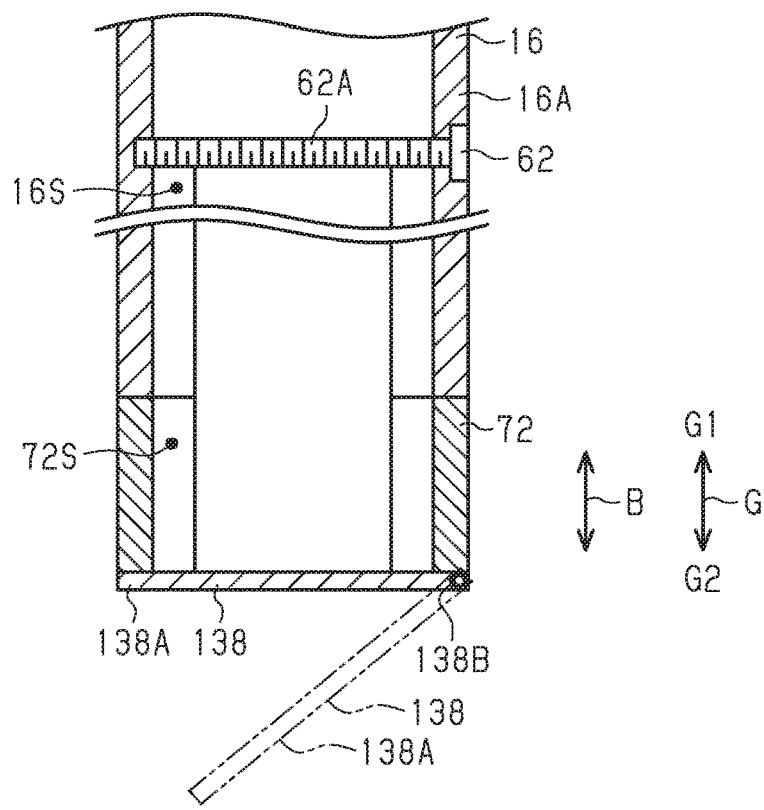
FIG. 35 is a cross-sectional view showing a second modified example of the first restriction in accordance with the first embodiment.

The first restrictions 74A can be changed to a first restriction 138 shown in FIG. 35. In a state in which the battery unit 40 is held by the battery holder 72, the first restriction 138 faces the battery unit 40 in a direction intersecting a direction parallel to the rotational center axis C1 of the crankshaft 88. The first restriction 138 includes, for example, a plate member 138A that covers the opening located at a lower side Y2 of the accommodation cavity 72S. Preferably, the first restriction 138 includes an elastic member 138B and is biased by the elastic member 138B in a direction covering the opening at the lower side Y2 of the accommodation cavity 72S. The elastic member 138B includes, for example, a torsion spring. The first restriction 138 can include a lock mechanism that locks the plate member 138A in a state in which the plate member 138A closes the opening at the lower side Y2 of the accommodation cavity 72S.

Figure 36:
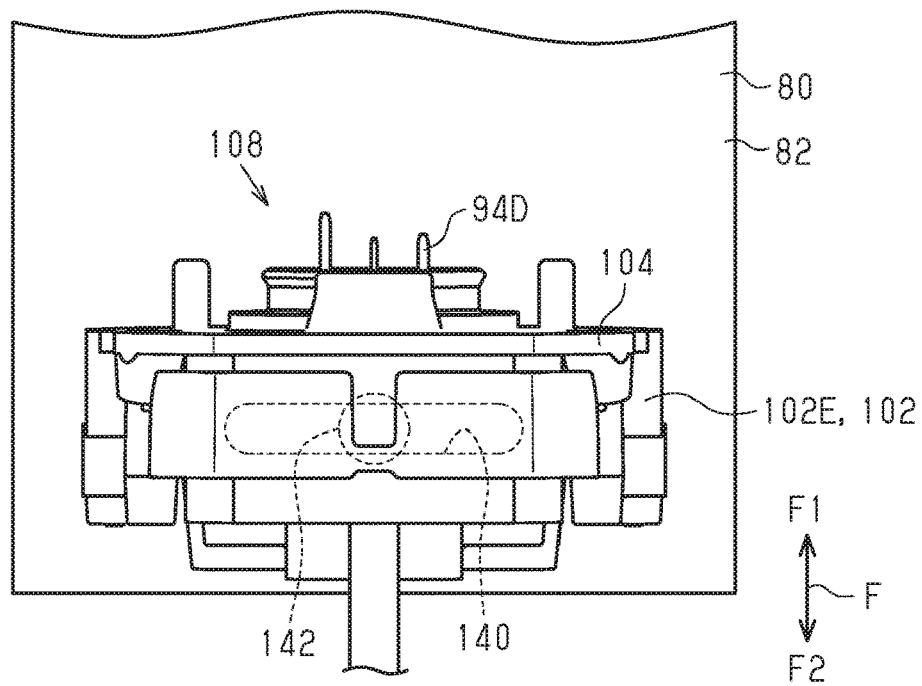
FIG. 36 is a bottom view of a battery holding device for a human-powered vehicle in a modified example of the second embodiment.

The predetermined linear direction can include a direction parallel to a direction in which the crankshaft 88 extends. For example, the holder mount 108 shown in FIG. 36 includes an elongated hole 140 that extends in a direction parallel to a direction in which the crankshaft 88 provided on the battery holder 102E extends, a male threaded fastener 142 inserted into the elongated hole 140, and a female threaded hole of the base 82. The holder mount 108 is configured to change the portion of the elongated hole 140 into which the male threaded fastener 142 is inserted to allow the battery holder 102E to be mounted at a plurality of positions in the predetermined linear direction.

In the first embodiment, the guide 86 can be omitted from the drive unit 80. The angle DX can be greater than 60 degrees. The electrical connector 94 can be disposed farther from the rotational center axis C1 of the crankshaft 88 than the rotational center axis C2 of the motor 90. The battery holder 72 can be located toward the rear side X2 of the human-powered vehicle 10 from the rotational center axis C1 of the crankshaft 88. For example, the drive unit 80 includes the base 82 on which the crankshaft 88 is provided, the frame mount 84 provided on the base 82 and configured to be mounted on the frame 16 of the human-powered vehicle 10, and the battery holder 72 provided on the base 82 and including the accommodation cavity 72S in which at least part of the battery unit 40 elongated in the longitudinal direction B is arranged. The base 82 can have the crankshaft 88. In a state in which at least part of the battery unit 40 is arranged in the accommodation cavity 72S, the accommodation cavity 72S extends through the battery holder 72 in the longitudinal direction B of the battery unit 40.

In the first embodiment, the guide 86 can be omitted from the drive unit 80. The accommodation cavity 72S extending through the drive unit 80 in the longitudinal direction B of the battery unit 40 can be omitted. The electrical connector 94 can be located farther from the rotational center axis C1 of the crankshaft 88 than the rotational center axis C2 of the motor 90. The battery holder 72 can be located toward the rear side X2 of the human-powered vehicle 10 from the rotational center axis C1 of the crankshaft 88. For example, the drive unit 80 includes the base 82 on which the crankshaft 88 is provided, the frame mount 84 provided on the base 82 and configured to be mounted on the frame 16 of the human-powered vehicle 10, the battery holder 72 provided on the base 82 and including the accommodation cavity 72S in which at least part of the battery unit 40 elongated in the longitudinal direction B is arranged, and the motor 90 provided on the base 82 and configured to apply a propulsion force to the human-powered vehicle 10. The rotational center axis C2 of the motor 90 is parallel to the rotational center axis C1 of the crankshaft 88. An angle DX formed by the first plane P1 including the rotational center axis C1 of the crankshaft 88 and the rotational center axis C2 of the motor 90 and the second plane P2 including the rotational center axis C1 of the crankshaft 88 and parallel to the longitudinal direction B of the battery unit 40 is greater than or equal to zero degrees and less than or equal to 60 degrees.

In the first embodiment, the guide 86 can be omitted from the drive unit 80. The accommodation cavity 72S extending through the drive unit 80 in the longitudinal direction B of the battery unit 40 can be omitted. The angle DX can be greater than 60 degrees. The battery holder 72 can be disposed toward the rear side X2 of the human-powered vehicle 10 from the rotational center axis C1 of the crankshaft 88. For example, the drive unit 80 includes the base 82 on which the crankshaft 88 is provided, the frame mount 84 provided on the base 82 and configured to be mounted on the frame 16 of the human-powered vehicle 10, the battery holder 72 provided on the base 82 and configured to hold the battery unit 40, the motor 90 provided on the base 82 and configured to apply a propulsion force to the human-powered vehicle 10, and the electrical connector 94 configured to electrically connect the battery unit 40 and the motor 90. The electrical connector 94 is located closer to the rotational center axis C1 of the crankshaft 88 than the rotational center axis C2 of the motor 90.

In the first embodiment, the guide 86 can be omitted from the drive unit 80. The accommodation cavity 72S extending through the battery unit 40 in the longitudinal direction B of the battery unit 40 can be omitted. The angle DX can be greater than 60 degrees. The electrical connector 94 can be located farther from the rotational center axis C1 of the crankshaft 88 than the rotational center axis C2 of the motor 90. For example, the drive unit 80 includes the base 82 provided on the crankshaft 88, the frame mount 84 provided on the base 82 and configured to be mounted on the frame 16 of the human-powered vehicle 10, the battery holder 72 provided on the base 82 and configured to hold the battery unit 40, and the motor 90 provided on the base 82 and configured to apply a propulsion force to the human-powered vehicle 10. In a state in which the frame mount 84 is mounted on the frame 16 of the human-powered vehicle 10 and the wheels 14 of the human-powered vehicle 10 are all in contact with a level ground, the rotational center axis C2 of the motor 90 is located vertically upward from the rotational center axis C1 of the crankshaft 88 or located toward the upper side Y1 from the rotational center axis C1 of the crankshaft 88 at the front side X1 of the human-powered vehicle 10, and the battery holder 72 is located toward the front side X1 of the human-powered vehicle 10 from the rotational center axis C1 of the crankshaft 88.

The drive unit 80 do not have to be configured so that the battery holders 72 and 102 are mountable at a plurality of positions in the predetermined linear direction. For example, the drive unit 80 includes the base 82 on which the crankshaft 88 is provided, the holder mounts 98 and 108 provided on the base 82 and configured to be attachable to and detachable from the battery holders 72 and 102, which are configured to hold the battery unit 40, and the frame mount 84 provided on the base 82 and configured to be mounted on the frame 16 of the human-powered vehicle 10. The holder mounts 98 and 108 and the frame mount 84 are located at different positions as viewed in a direction in which the crankshaft 88 extends.

The battery holders 72 and 102 can be omitted from the drive unit 80. The battery holders 72 and 102 can be omitted from a drive unit having the same structure as the drive unit 80. A battery holder that is not included in the drive unit 80 can have the same structure as the battery holders 72 and 102. In this case, in an example, preferably, the battery holding devices 70 and 100 include a battery holder configured to be mounted on the drive unit at a plurality of positions in the predetermined linear direction. In another example, preferably, the battery holding devices 70 and 100 include a battery holder configured to be attachable to and detachable from a drive unit. The battery holder and the frame mount 84 are configured to be mounted on the drive unit at different positions as viewed in a direction in which the crankshaft 88 extends.

Instead of or in addition to the motor 90, the drive unit 80 can include a transmission that changes the transmission ratio of the human-powered vehicle 10. The transmission ratio of the human-powered vehicle 10 is a ratio of rotational speed of the drive wheel 14A to rotational speed of the crankshaft 88.

The battery unit 40 can be mounted on the seat tube 16D or the chainstay 16F. The direction in which the rotational center axis C2 of the motor 90 extends can intersect the direction in which the rotational center axis C1 of the crankshaft 88 extends.

In the first embodiment, the guide 86 can be formed separately from the base 82. For example, the guide 86 can be attached to the base 82 by a fastener member such as a bolt, adhesive, or welding to be formed integrally with the base 82. In the first embodiment, the guide 86 can be formed separately from the battery holder 72. For example, the guide 86 can be attached to the battery holder 72 by a fastener member such as a bolt, an adhesive, or welding to be integrated with the battery holder 72.

What is claimed is:

1. A drive unit for a human-powered vehicle, the drive unit comprising:
    a base on which a crankshaft is provided;
    a frame mount provided on the base and configured to be mounted on a frame of the human-powered vehicle; and
    a battery holder provided on the base separately from the frame, the battery holder being located on a front side of the base such that at least a portion of the battery holder is disposed forward and below with respect to a center rotational axis of the crankshaft in a state in which the frame mount is mounted on the frame, the battery holder further including an accommodation cavity in which at least part of a battery unit elongated in a longitudinal direction is arranged,
    the accommodation cavity extending through the battery holder in the longitudinal direction of the battery unit in a state in which the at least part of the battery unit is arranged in the accommodation cavity, opposing longitudinal ends of the battery holder being open such that the battery unit can pass there-through in an installed state of the battery unit, the accommodation cavity being configured such that the battery holder completely surrounds a circumference of the battery unit in the installed state of the battery unit when viewed along the longitudinal direction of the battery unit, and
    the drive unit being configured such that one of the opposing longitudinal ends of the battery holder abuts with an open end of a down tube of the frame when the frame mount is mounted on the frame.

2. The drive unit according to claim 1, further comprising a motor provided on the base and configured to apply a propulsion force to the human-powered vehicle.

3. A drive unit for a human-powered vehicle, the drive unit comprising:
    a base on which a crankshaft is provided;
    a frame mount provided on the base and configured to be mounted on a frame of the human-powered vehicle;
    a battery holder provided on the base, the battery holder including an accommodation cavity in which at least part of a battery unit elongated in a longitudinal direction is arranged, opposing longitudinal ends of the battery holder being open such that the battery unit can pass there-through in an installed state of the battery unit; and
    a motor provided on the base and configured to apply a propulsion force to the human-powered vehicle,
    a rotational center axis of the motor being parallel to a rotational center axis of the crankshaft, and
    an angle between a first plane including the rotational center axis of the crankshaft and the rotational center axis of the motor and a second plane including the rotational center axis of the crankshaft and extending parallel to the longitudinal direction of the battery unit is greater than or equal to 0 degrees and less than or equal to 60 degrees,
    the accommodation cavity being configured such that the battery holder completely surrounds a circumference of the battery unit in the installed state of the battery unit when viewed along the longitudinal direction of the battery unit, and the drive unit being configured such that one of the opposing longitudinal ends of the battery holder abuts with an open end of a down tube of the frame when the frame mount is mounted on the frame.

\* \* \* \* \*